United States Patent [19]

Nakagaki et al.

[11] Patent Number: 5,532,835
[45] Date of Patent: Jul. 2, 1996

[54] TRACKING CONTROL IN APPARATUS FOR FAST REPRODUCING DIGITAL INFORMATION SIGNAL FROM MAGNETIC TAPE

[75] Inventors: Harushige Nakagaki; Naozumi Sugimura; Takao Arai; Yasunori Ohara, all of Yokohama, Japan

[73] Assignee: Hitachi, Ltd., Japan

[21] Appl. No.: 441,703

[22] Filed: May 15, 1995

[30]  Foreign Application Priority Data

| May 13, 1994 | [JP] | Japan | 6-099513 |
| May 24, 1994 | [JP] | Japan | 6-109303 |
| May 24, 1994 | [JP] | Japan | 6-109304 |

[51] Int. Cl.$^6$ .............................. H04N 5/76; H04N 5/78; G11B 15/46; G11B 5/55
[52] U.S. Cl. ..................... 358/335; 358/312; 360/10.2; 360/72.1; 360/73.08; 360/77.12; 360/78.02
[58] Field of Search ........................... 358/321, 327, 358/338, 312; 360/10.1, 10.2, 10.3, 69, 72.2, 72.1, 77.01, 77.12, 70, 73.1, 73.05, 73.08, 78.02

[56]  References Cited

U.S. PATENT DOCUMENTS

| 4,476,500 | 10/1984 | Isaka et al. | 360/78.02 |
| 4,647,990 | 3/1987 | Sasamura | 360/70 |
| 4,679,104 | 7/1987 | Dahlerud | 360/78.02 |
| 5,107,381 | 4/1992 | Mitsuhashi et al. | 360/70 |
| 5,177,647 | 1/1993 | Takayanagi | 360/73.08 |
| 5,182,681 | 1/1993 | Yamazaki | 360/70 |
| 5,218,489 | 6/1993 | Jeong et al. | 360/70 |
| 5,243,474 | 9/1993 | Mitsuhashi | 360/70 |
| 5,255,134 | 10/1993 | Sekiya et al. | 360/70 |
| 5,262,905 | 11/1993 | Takagi et al. | 360/70 |
| 5,414,568 | 5/1995 | Taki et al. | 360/73.05 |

OTHER PUBLICATIONS

"Fast Scan Technology for Digital Video Tape Recorders," J. Boyce et al., IEEE Trans. on Consumer Electronics, vol. 39, No. 3, Aug. 1993, pp. 186–191.

Primary Examiner—Thai Q. Tran
Assistant Examiner—David R. Vincent
Attorney, Agent, or Firm—Evenson, McKeown, Edwards & Lenahan

[57]  ABSTRACT

The helical scan reproducing apparatus for magnetically recorded digital information signal reproduces the digital information from the magnetic tape wrapped around the rotary cylinder. The digital information signal is recorded on a plurality of recorded tracks of the magnetic tape. The magnetic heads of the rotary cylinder scan the recorded tracks to reproduce the digital information signal. The reproducing apparatus has the standard playback mode in which it is operated to reproduce at the standard speed and the fast playback mode in which it is operated to reproduce at a higher speed than the standard speed. The tracking control in the reproducing apparatus controls the speed of the magnetic tape so that in the fast playback mode the magnetic heads precisely trace the particular regions of the tracks which particular regions have data for fast playback mode recorded. Each of the tracks is divided into a plurality of blocks. Each of the blocks has recorded therein the digital information signal and an identification signal formed of a track number for indicating the corresponding track and a block number for indicating the corresponding block. At least one particular block of the blocks on each track has the digital information signal recorded for the fast playback mode. The particular blocks are dispersedly arranged over the plurality of tracks in such a manner that in the fast playback mode the magnetic heads scan the particular blocks along their scan path on the magnetic tape.

14 Claims, 17 Drawing Sheets

FIG. 7

| TRACK NUMBER | PARTICULAR BLOCK NUMBER |
|---|---|
| T 1 | 0 |
| T 2 | 5 |
| T 3 | 10 |
| T 4 | 15 |
| T 5 | 20 |
| T 6 | 25 |
| T 7 | 30 |
| T 8 | 35 |

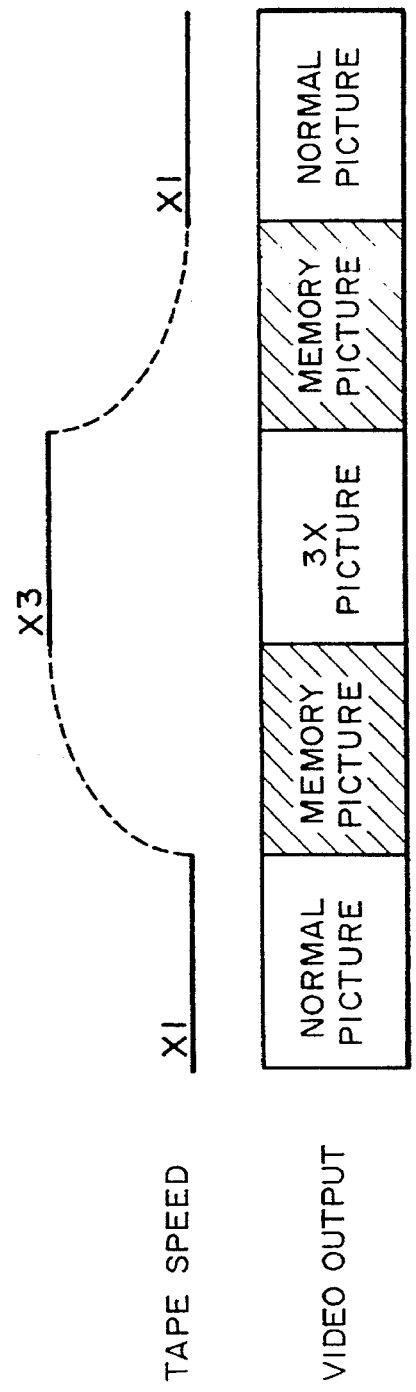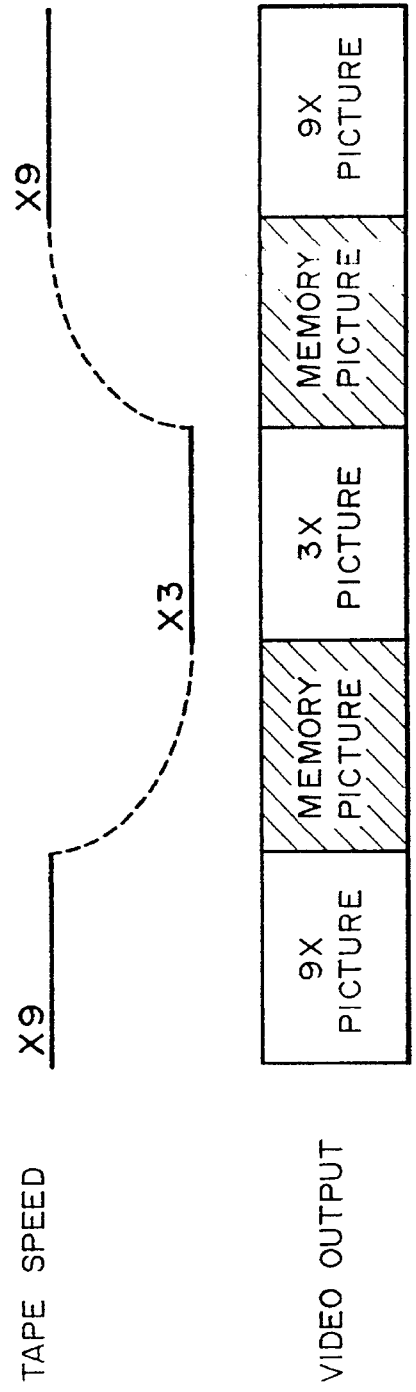

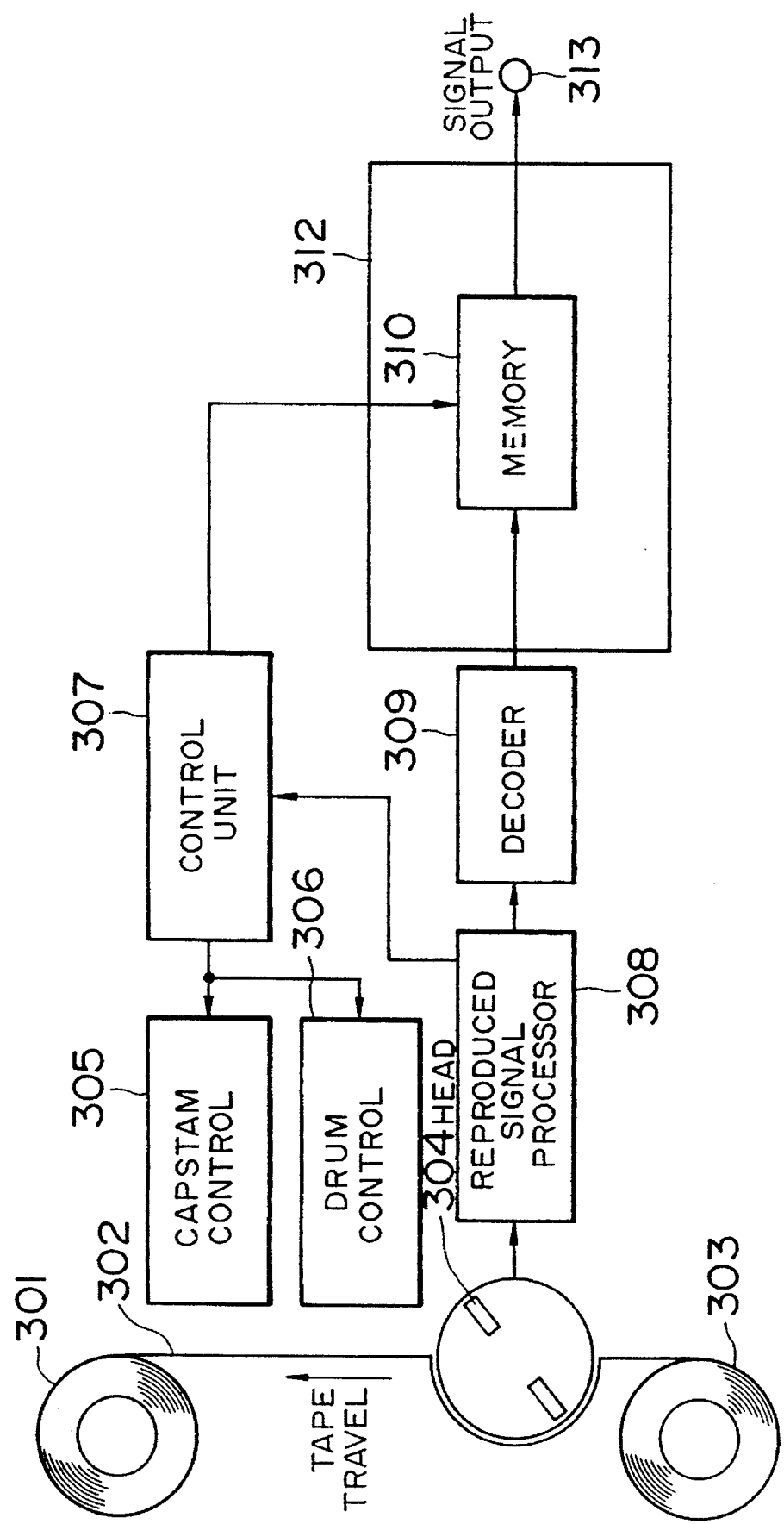

TRACKING CONTROL IN APPARATUS FOR FAST REPRODUCING DIGITAL INFORMATION SIGNAL FROM MAGNETIC TAPE

BACKGROUND OF THE INVENTION

This invention relates to high-speed playback techniques in consumer digital video tape recorders (VTRs) for recording/reproducing digital video signal by rotating magnetic heads, and particularly to a tracking control method suitable for trick playback of magnetic tape on which information for trick playback at an arbitrary speed faster than normal playback speed is recorded dispersedly over the respective tracks as the rotary magnetic heads scan.

The video playback system of digital VTR has the so-called normal play mode in which the recorded video signal is reproduced at normal speed, and the fast playback mode including fast forward and fast reverse modes, or what is called the trick play mode in which particular pictures are fast searched for or in which video images are fast forwarded while being viewed. In the fast playback mode, three-times normal speed, nine-times normal speed or other playback speed can be set. The "trick playback" used in the specification of this application means such high-speed playback.

The consumer use digital VTR employs image compression technology in order to reduce the amount of data being recorded on magnetic tape. An example of the image compression technology used is generally the so-called MPEG (Moving Picture Experts Group) system.

In the MPEG system, since the video image is built up by use of the difference between adjacent frame data when the continuity of successive frame data is lost by the fast playback, video image cannot be decoded from this data.

A fast playback method in VTR using image compression by MPEG system is proposed which is disclosed in, for example, "FAST SCAN TECHNOLOGY FOR DIGITAL VIDEO TAPE RECORDERS", IEEE Transactions on Consumer Electronics, Vol. 39, No. 3, August 1993, pp. 186–191.

According to this method, in order that video images can be decoded even in the fast playback mode, video data for fast playback mode which is separated from the video data for normal playback is dispersedly recorded on a magnetic tape at particular positions along a scan path of the playback heads according to the tape speed for trick playback. Thus, trick playback such as searching and shuttle playback can be performed even from the tape on which compressed data recording is already made by MPEG algorithms.

In the trick playback according to the above method, however, there are the following problems.

Since the video data for trick playback is recorded only on particular tracks corresponding to a path along which the heads scan the magnetic tape, the rotary magnetic heads must be swiftly controlled to precisely trace a certain video-data-recorded track when playback speed is changed from normal speed to a trick play speed or from a trick play speed to another different trick play speed. In this method, any head-controlling mechanism is not considered and not disclosed.

SUMMARY OF THE INVENTION

It is an object of the invention to provide a tracking control which can control the magnetic heads to be quickly pulled in a predetermined track and to precisely trace a track for trick playback when playback speed is changed from normal speed to a trick speed or from a trick play speed to another different trick play speed.

A helical-scan type playback apparatus for digital magnetically-recorded signal, to which this invention is applied, has a rotary cylinder, and magnetic heads mounted on the rotary cylinder. A digital information signal is recorded over a plurality of recording tracks on a magnetic tape wrapped around the rotary cylinder. The magnetic heads are rotated to scan the recorded tracks so that the digital information signal can be reproduced from the tracks. The playback apparatus has a standard playback mode in which it operates to reproduce a video signal at a standard speed, and a fast playback mode in which it operates to reproduce the video signal at a higher speed than the standard speed. The tracking control of this invention controls the magnetic tape speed so that in the fast playback mode the magnetic heads can precisely trace the data-recorded track for fast playback mode at particular positions. Each of a plurality of tracks is divided into a plurality of blocks. Each of the blocks has recorded therein a digital information signal and an identification signal which indicates a track number for a particular track and a block number for a particular block. A digital information signal for fast playback mode is recorded in at least one particular block on each track. Those particular blocks are dispersedly recorded over a plurality of tracks so that they can be arranged on the magnetic tape along a path which the magnetic heads should scan in the fast playback mode.

According to one aspect of the invention, the tracking control has a fast traveling control unit for causing the magnetic tape to travel at a higher speed than the standard playback speed, a unit for detecting a positional error between a track having a reproduced block and a particular-block-recorded track on the basis of the identification signal of the block reproduced by the magnetic heads and generating a track error signal corresponding to the error, a unit for detecting a positional error between the magnetic heads and a target track on the basis of a signal reproduced by the magnetic heads and generating a tracking error signal corresponding to the positional error, a switching unit for selectively producing either the track error signal or the tracking error signal, a phase control unit for controlling the magnetic tape speed so that the positional error is reduced to zero on the basis of the output from the switching unit, and a control circuit for controlling the operations of the fast traveling control unit and the switching unit. The control circuit, in the fast playback mode, causes the fast traveling control unit to operate, maintaining the magnetic tape at a fast playback speed. When the magnetic tape reaches a predetermined playback speed, the switching unit produces the track error signal. When the track error signal has arrived at a certain range, the switching unit produces the tracking error signal.

BRIEF DESCRIPTION OF THE DRAWINGS

FIG. 7 shows one example of the address table for indicating the relation between the track number and the block number of particular blocks;

FIGS. 16A and 16B show the relations between the playback speed and video output in the tracking control of FIG. 15;

FIG. 17 is a block diagram of still another embodiment of the tracking control of the invention.

DESCRIPTION OF THE PREFERRED EMBODIMENTS

Embodiments of the invention will be described with reference to the accompanying drawings.

Figure 1:
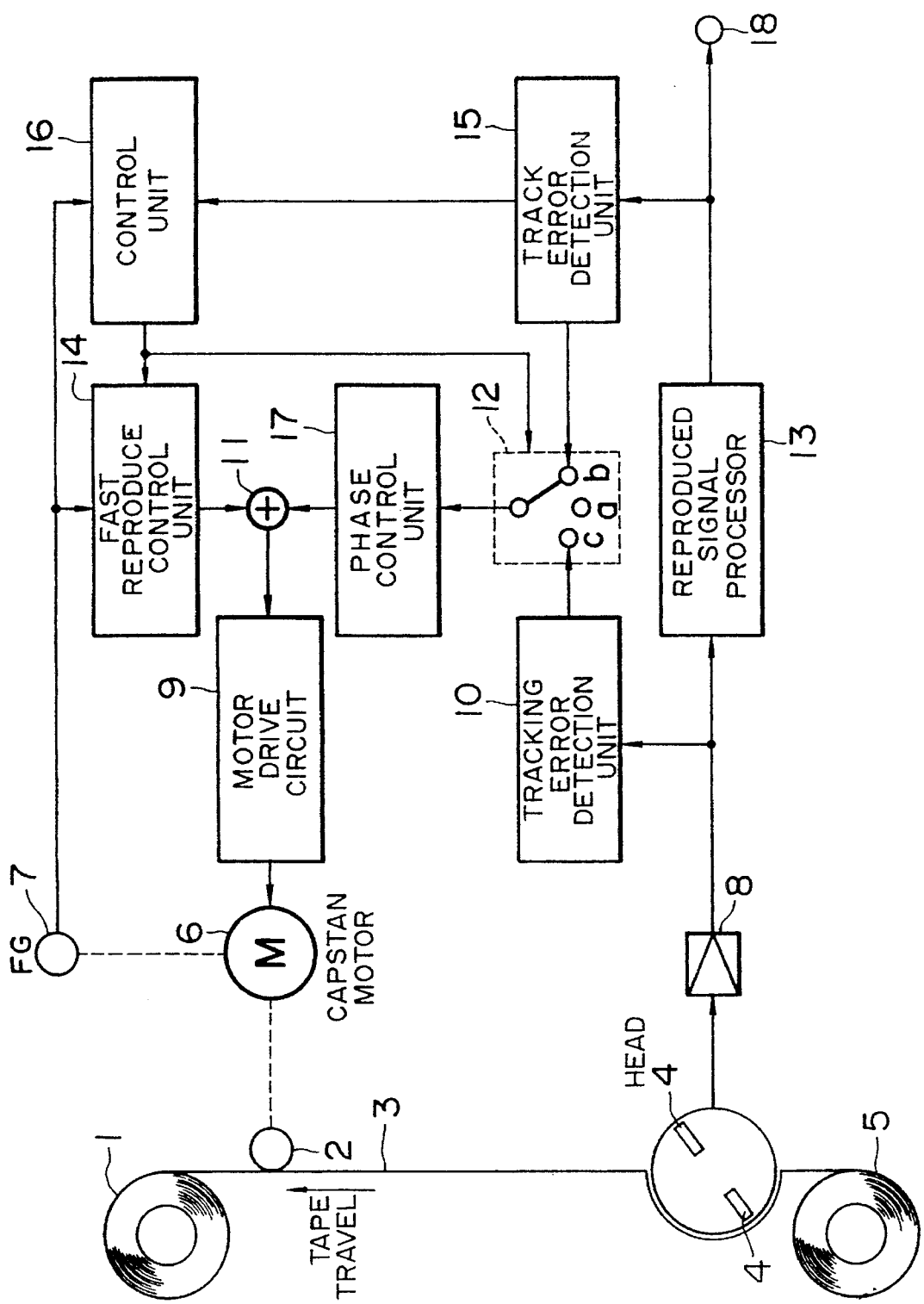
FIG. 1 is a block diagram of an embodiment of the tracking control of the invention.

FIG. 1 is a block diagram of one embodiment of the tracking control of the invention In FIG. 1, there are shown a take-up reel 1 on which the magnetic tape is wound, a capstan 2 for driving the magnetic tape to travel, the magnetic tape 3, rotary magnetic heads 4, a supply reel 5 for supplying the magnetic tape, a capstan motor 6 for rotating the capstan 2, an FG (tacho generator) 7 for generating a frequency signal synchronized with the revolution speed of the capstan motor 6, a preamplifier 8 for amplifying the signal reproduced by the rotary magnetic heads 4, a motor drive circuit 9 for driving the capstan motor 6 to rotate, a tracking error detection unit 10 for detecting tracking error from the signal reproduced by the heads, an adder circuit 11, and a switching unit 12. In addition, there are shown a reproduce signal process unit 13 for making a certain process on the reproduced signal to produce data, a fast reproduce control unit 14 for causing the capstan motor to fast rotate in trick playback mode, thereby making the tape travel at a high speed, a track error detection unit 15 for detecting the scanned track number error of the tracks which have trick playback data recorded, a control unit 16, a phase control unit 17 for controlling the scanning phase of the heads, and an output terminal 18.

Figure 2:
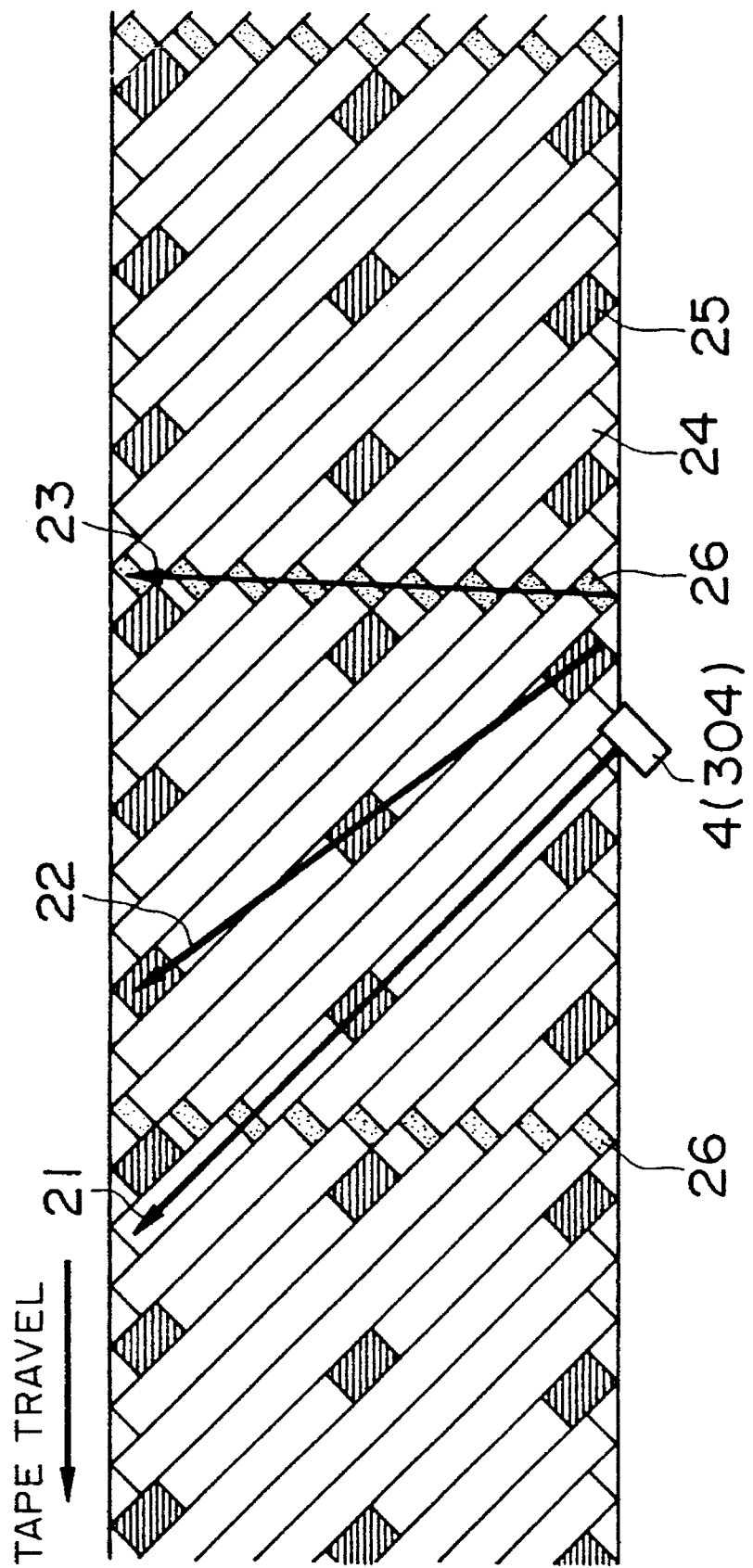
FIG. 2 shows a recorded pattern of fast playback information recorded on tracks.

Before the description of the control operation of the embodiment of FIG. 1, the recorded pattern of trick playback data by a digital VTR to which this invention is applied will be mentioned with reference to FIG. 2 and the following.

The compressed data of one frame for trick playback is recorded on some tracks in a divided manner in order to meet a path along which the heads scan at the playback speed. FIG. 2 shows examples of the fast forward playback modes of 3-times, 9-times normal speed.

Referring to FIG. 2, there are shown a scan path 21 of the rotary magnetic heads 4 in the normal playback mode, a scan path 22 of the heads in the 3-times normal speed playback mode, and a scan path 23 of the heads in the 9-times normal speed playback mode. In addition, there are shown blank sections 24, shaded sections 25, and gray-tone sections 26 on the tracks which are, respectively, indicate the normal-mode video data recorded regions, 3-times normal speed mode video data recorded regions and 9-times normal speed mode video data recorded regions.

In the three-times speed playback mode, the heads diagonally scan three consecutive tracks as indicated by the arrow 22 in FIG. 2. Thus, in order to make 3-times normal speed playback, the data 25 for three-times normal speed playback is required to be recorded in a divided manner on the three tracks at particular positions to meet the scan path of the heads 4. Similarly, in the nine-times normal speed playback mode, the data 26 for nine-times normal speed playback is recorded in a divided manner on the nine tracks since the heads 4 scan across nine tracks as indicated by the arrow 23.

In addition, each track includes a plurality of data blocks of about several hundred bytes each, and each data block includes image data and a block address of track number/block number.

Although examples of 3× and 9× speed forward modes are shown in FIG. 2, information for arbitrary playback speeds may of course be recorded, if necessary. Also, data for trick playback in the fast reverse direction (negative) may be recorded.

A description will be made of the tracking control operation of the embodiment of FIG. 1 for 9× trick playback on the tape on which such pattern as shown in FIG. 2 is recorded.

When a trick playback command key (not shown) is operated by the user, the control unit 16 detects this operation, controlling the switching unit 12 to change to the contact-a position, and also it detects the trick playback command speed, supplying a command speed value to the fast reproduce control unit 14.

Thus, the fast reproduce control unit 14 starts to control the revolution speed of the capstan motor 6 so that the tape 3 is transported at a trick playback speed specified by the control unit 16. The tape speed is controlled by only the speed control of the fast reproduce control unit 14 with the phase control made inactive to reach a 9× speed as indicated by the curve 32 in FIG. 3.

The fast reproduce control unit 14 shares, for example, the speed control circuit for normal playback, and in a trick playback mode it divides the frequency of the capstan FG signal 7 by a number corresponding to the trick/normal speed ratio. The details for this construction are well known and thus will not be described.

Figure 3:
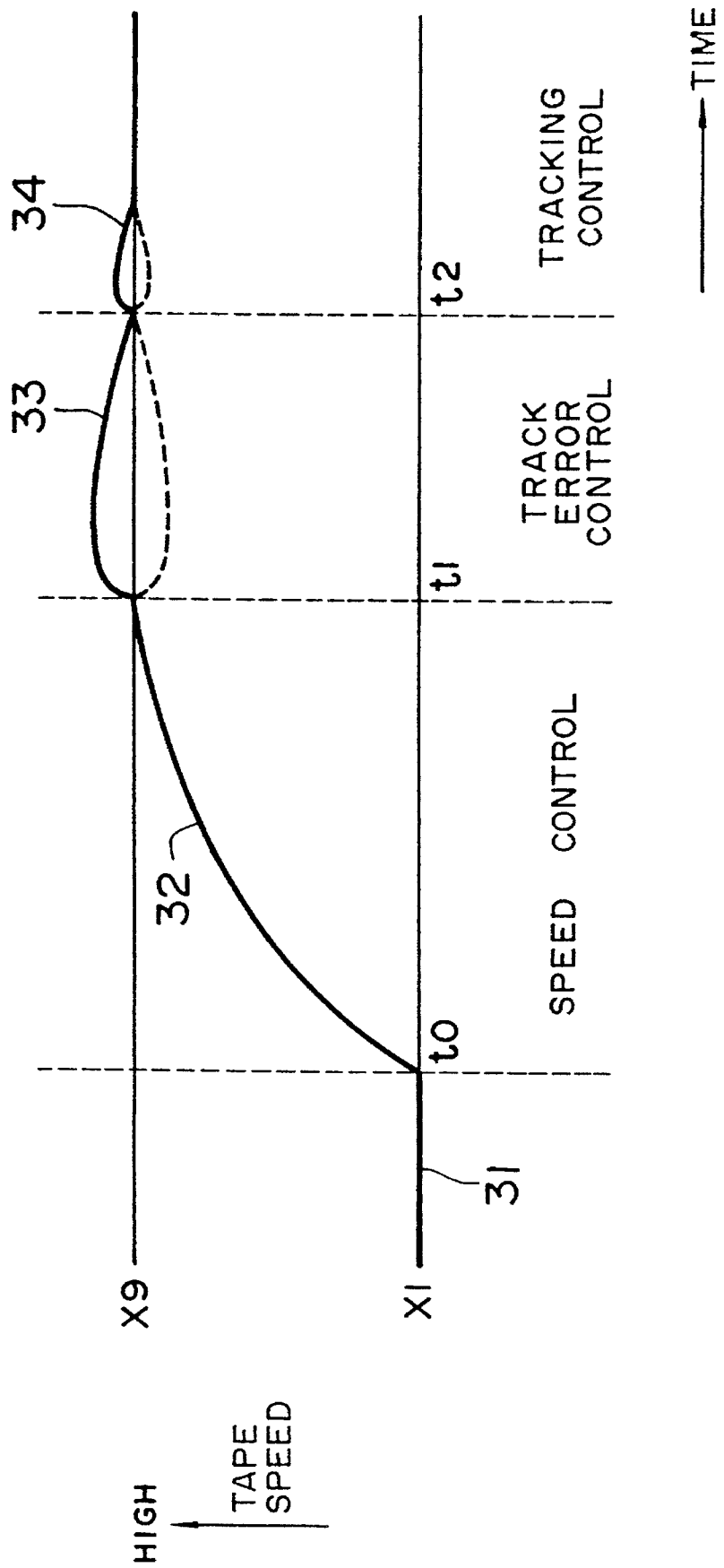
FIG. 3 shows curves of controlled tape speed in fast playback mode.

When the tape speed arrived at the nine-times normal speed at time t1 in FIG. 3, the control unit 16 detects this situation from the frequency from the capstan FG 7, changing the switching unit 12 from the contact-a position to the contact-b position, or controlling the switching unit 12 to permit the track error detection unit 15 to supply its output to the phase control unit 17. At this time, since the phase control is inactive at time t1, the heads do not always scan the block 26 for 9× speed playback data as indicated by the arrow 23 in FIG. 2, but scan out of the desired scan path 23 the moment that the switching unit 12 is changed to the contact-b position shown in FIG. 1.

The track error detection unit 15 detects the block address of reproduced data from the data train reproduced through the reproduce signal process unit 13 and compares this block address with the block address table in which the original 9× playback data is recorded. Then it calculates error between the current scanned track and the desired track for trick playback and produces an error signal according to the scan track error number and error direction.

Figure 4:
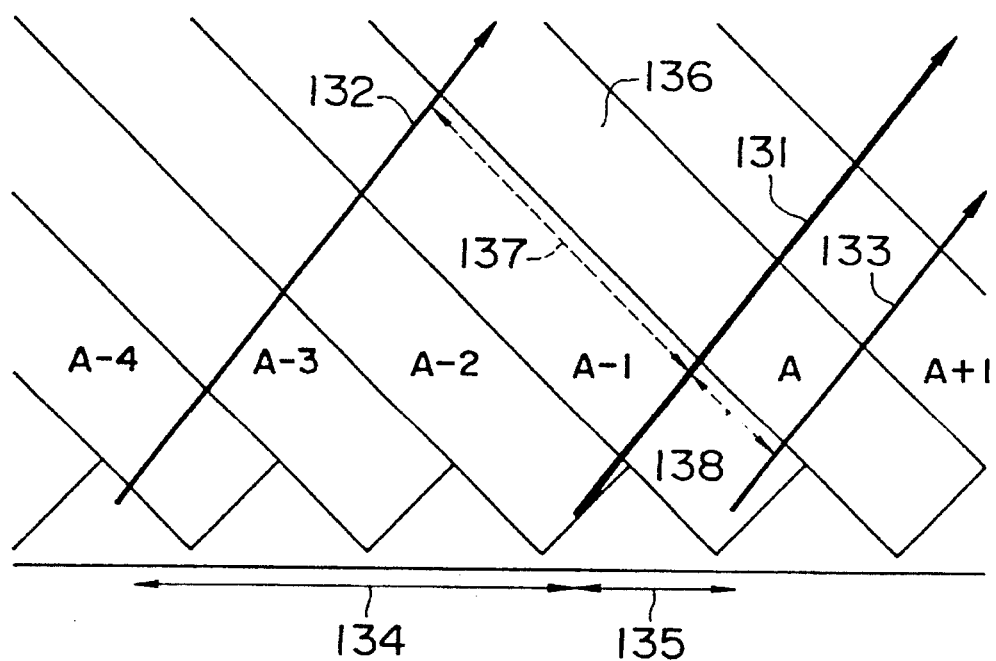
FIG. 4 shows an enlarged part of the tracks of FIG. 2 and paths along which the magnetic heads scan.
Figure 5:
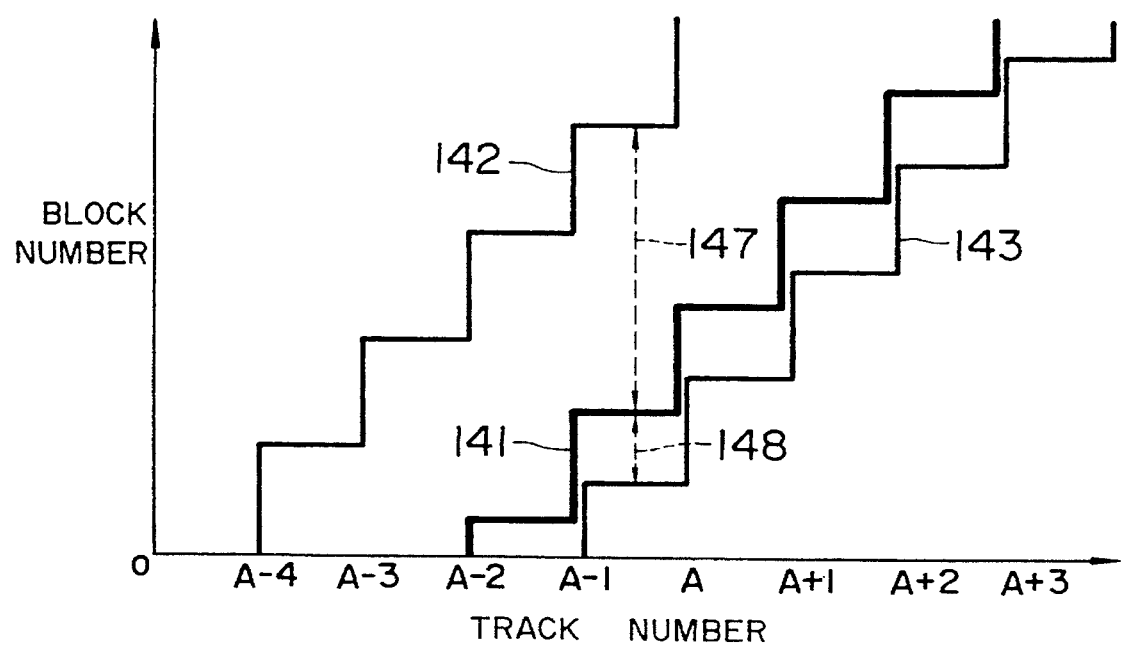
FIG. 5 is a diagram showing the relation between the track number of recorded tracks and the block number in FIG. 4.

FIGS. 4 and 5 are diagrams to which reference is made in explaining the principle of detecting track error, or phase error in the embodiment of FIG. 1. FIG. 4 is a partially enlarged view of the relation between the tracks and scan path of heads on the magnetic tape shown in FIG. 2. FIG. 5 shows the relation between the track number and block number scanned by the reproduce heads. In FIG. 4, 131, 132 and 133 indicate scan paths of reproduce heads. The scan path 131 indicates the reference phase with which the reproduce heads scan the center of the block 26 for trick playback mode shown in FIG. 2. Thus, the scan paths 132 and 133 are deviated a phase, difference 134 of −2.5 tracks and a phase difference 135 of +0.5 tracks in tape direction relative to the desired scan path 131, respectively. Track numbers A-4, A-3, A-2, A, A+1 are attached to the tracks. When the reproduce heads reach the track 136 of track number A, the phase difference values in the lengthwise direction of tracks are indicated by broken-line arrows 137 and 138. In FIG. 5, 141, 142 and 143 show the relations between the track number and block number reproduced when the scan paths of the reproduce heads are 131, 132 and 133. The curve 141 is the reference to those relations. Broken-line arrows 147 and 148 indicate the difference values of the block numbers reproduced when the reproduce heads reach track 136, relative to the scan path 131.

From the geometrical relation, it will be understood that the phase difference values 134 and 135 in the tape transport direction are respectively proportional to the phase difference values 137 and 138 in the longitudinal direction of tracks Which are produced when the heads reach the track 136 along the scan paths 132 and 133. The proportional constant is determined by the gradient of the reproduce heads to the tracks, or the trick playback speed. In addition, since the absolute position in the lengthwise direction of track can be detected by the block number recorded on each track, the phase difference in the lengthwise direction of track can be calculated by detecting the block number to be reproduced and the difference between it and the reference number when the reproduce heads reach the track 136 at each scan phase. In other words, the block number differences 147 and 148 are proportional to the phase differences 137 and 138 in the lengthwise direction of track, respectively, and the proportional constant is determined by the total number of blocks assigned in the lengthwise direction of track.

Since there are these two relations, the block number differences 147 and 148 reproduced when the reproduce heads reach the track 136 along the scan paths 132 and 133 are proportional to the phase differences 134 and 135 in the tape transport direction, and the proportional constant is the reciprocal of the number of blocks per track reproduced by the reproduce heads. This value is estimated from the total number of blocks in the lengthwise direction of track and the number of tracks which the heads cross.

Therefore, a particular track such as track 136 is selected for the comparison between block numbers. The block number reproduced when the reproduce heads reach the particular track along a reference scan path such as path 131 is used as the reference block number. Also, a block number reproduced when the reproduce heads actually reach the particular track along a path is detected as a compared block number which is to be compared with the reference block number. The phase difference in the tape transport direction, or track error can be calculated by multiplying the number difference between the reference block number and the actually reproduced block number by the reciprocal of the number of blocks per track reproduced by the heads. This is the principle for phase error detection in this embodiment.

Figure 6:
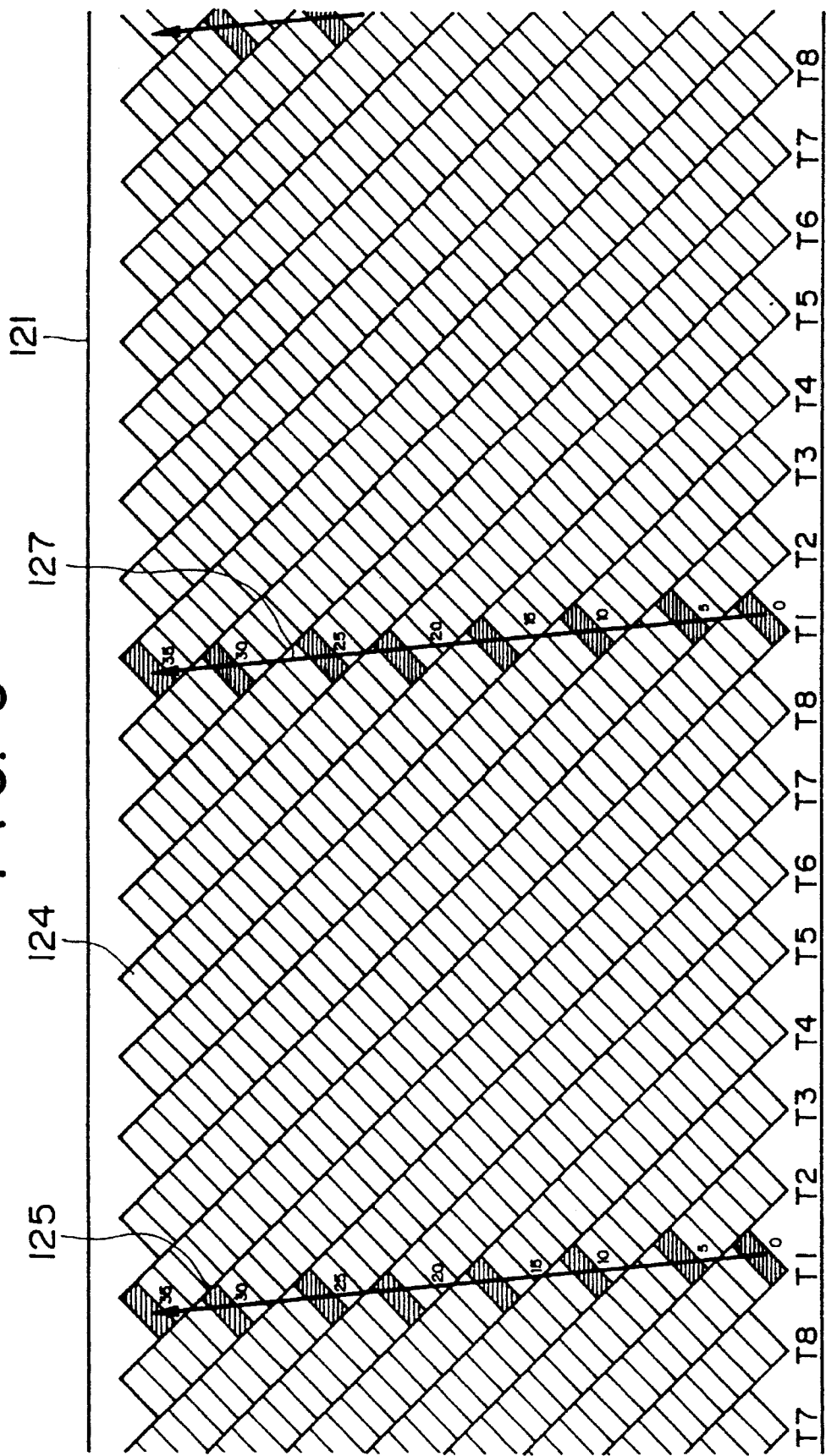
FIG. 6 shows one example of the track pattern to which reference is made in explaining the phase error detecting method.

FIG. 6 is a diagram to which reference is made in explaining a method of calculating the reference block number by the track error detection unit 15. An arrow 127 represents a scan path along which the heads scan the center of the track 26 for 8× trick playback. The numbers attached at the beginning ends of tracks indicate track numbers, and the numbers on each track designate block numbers. The track numbers are initialized at every eight tracks, of have cycles of eight tracks. Each track has 40 blocks, which are numbered as 0 through 39 in the order of being scanned by the heads. The video data 25 for 8× trick playback is recorded in each of tracks T1 through T8 at particular blocks 0, 5, 10, 15, 20, 25, 30, and 35.

From FIG. 6, it will be seen that when the heads scan the center of the track 26 for 8× trick playback along the scan path 127, the block numbers at which the heads cross the respective tracks are the particular block numbers. Thus, a table showing a relation between the track numbers and particular block numbers can be produced as shown in FIG. 7. FIG. 7 shows the block numbers of blocks reproduced when the heads reach the respective tracks in the 8× trick playback mode. If such a data table for each playback speed is stored in the track error detection unit 15, the reference block numbers can be produced for every playback speeds.

Therefore, when the scan path of the heads is out of a desired track at time t1, an error signal according to the amount of deviation and direction is supplied from the track error detection unit 15 to the phase control unit 17. Thus, the phase control unit 17 makes phase-pull-in control so that this error signal becomes zero, or that the heads scan the desired track.

The curve, 33 in FIG. 3 indicates this phase-pull-in control when the scan phase of the heads lags behind a desired scan phase, the tape speed is increased as indicated by the solid line. Contrarily, when it leads ahead of the desired phase, the tape speed is decreased as indicated by the broken line so that the heads are pulled in toward the track in which 9× trick playback data is recorded.

Then, at time t2, when the head scan phase reaches one track before the desired phase, the track error detection unit 15 supplies a signal indicative of this situation to the control unit 16. The control unit 16 controls the switching unit 12 to change from the contact-b position to the contact-c position, or the control signal to the phase control unit 17 is supplied from the tracking error detection unit 10 in place of the track error detection unit 15.

The tracking error detection unit 10 can be easily realized by use of, for example, the area division ATF (automatic track finding) system which is well known in DAT (digital audio tape recorder). Although the tracking error detection unit will not be described in detail because the details thereof are not directly related to the main point of this invention, it produces an error signal in accordance with the amount of off-track and off-track direction of the heads relative to the recorded track. As a specific example of the tracking error detection unit, an ATF tracking control unit can be used which is disclosed in the co-pending U.S. patent application Ser. No. 08/315,720 which was filed in Sep. 30, 1994 by Keiji Nagayama, et al The ATF tracking control unit disclosed in the specification of this co-pending Patent Application generates the tracking error signal on the basis of the cross-talk signal from the adjacent tracks to this track while the magnetic heads are tracing the target track.

After time t2, the phase control unit 17 makes phase-pull-in control (the tape speed is changed as indicated by 34 in FIG. 3) on the basis of the control signal from the tracking error detection unit 10. The heads thus come to scan the center of the blocks having 9× trick playback data recorded along the scan path 23 shown in FIG. 2.

As illustrated in FIG. 1, the phase pull-in control is made in two steps by the track error detection unit 15 and the tracking error detection unit 10 so that coarse phase pull-in control is made up to the proximity of the target track by use of the control signal from the track error detection unit 15 and that precise phase control is performed thereafter on the basis of the control signal from the tracking error detection unit 10. The reason is that the resolution of the head scan phase error detection by the track error detection unit 15 is as coarse is one track and that the heads are needed to be fast pulled in the desired phase toward the target track for trick playback.

Thus, according to this embodiment, when the magnetic tape is reproduced which has already recorded thereon information for trick playback of an arbitrary speed faster than the normal speed which information is dispersedly recorded on respective tracks at proper positions according to the scan path along which the rotary magnetic heads scan, fast phase pull-in control toward the target track can be performed, and the information blocks for trick playback can be precisely traced.

The phase control in the embodiment shown in FIG. 1 has the following drawback. After the scan phase of the heads is pulled in the track for trick playback, only the tracking error detection unit makes phase control, and thus when the scan phase Of the heads is unlocked by an external disturbance occurring on, for example, the tape transport mechanism, the scan path of the heads is deviated from the desired trick playback track because there is no restoring function, so that the information for trick playback cannot be reproduced.

Figure 8:
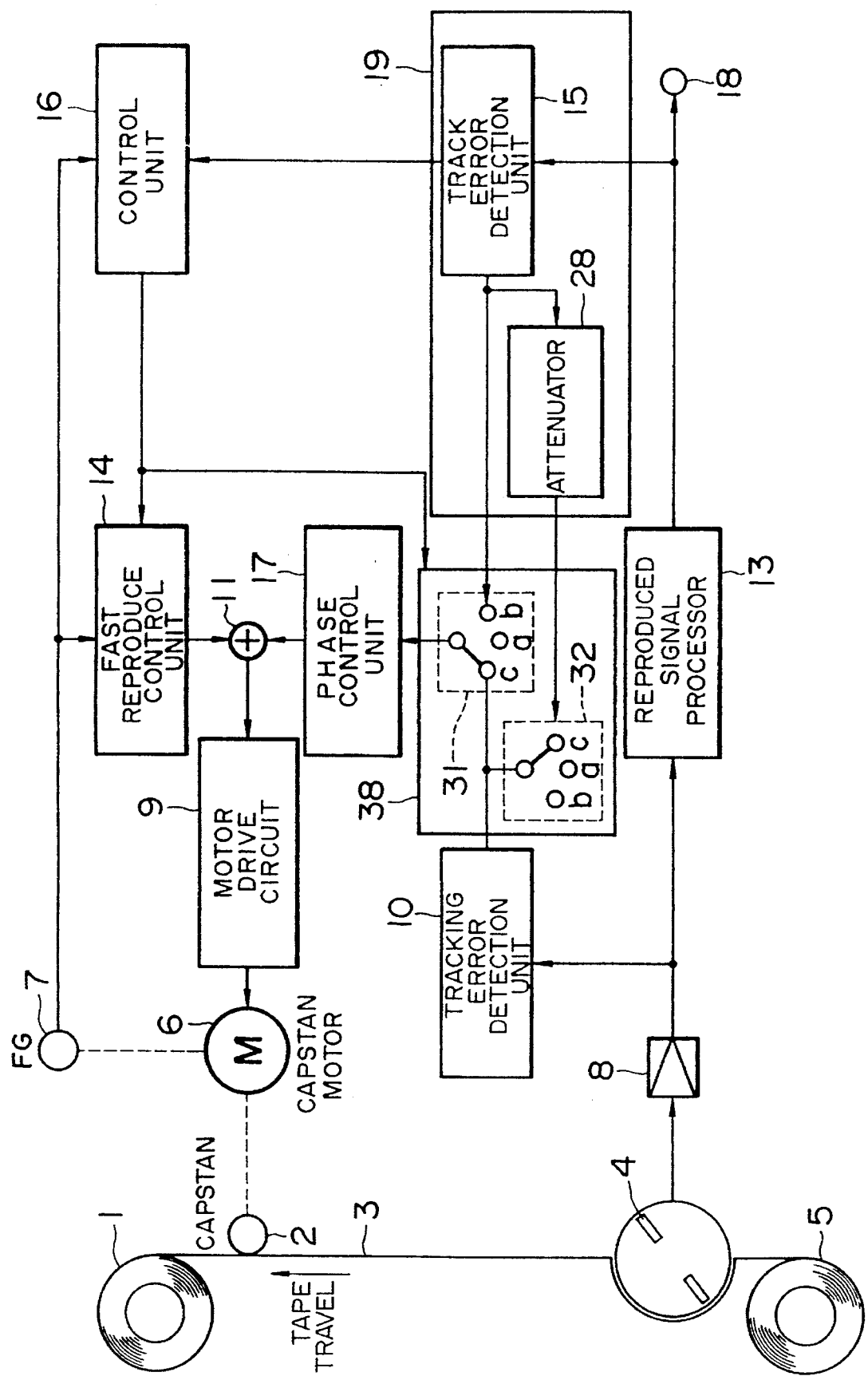
FIG. 8 is a block diagram of another embodiment of the tracking control of the invention.

FIG. 8 shows another embodiment of the tracking control of the invention with the above drawback obviated. Referring to FIG. 8, there are shown a track error detection unit 19 which is formed of the track error detection unit 15 same as shown in FIG. 1 and an attenuator 20 which produces an attenuated error signal so that two error signals are produced on two channels, and a switching unit 30 which is formed of a first switching unit 31 and a second switching unit 32. In FIG. 8, other like elements corresponding to those in FIG. 1 are identified by the same reference numerals and make the same operations as in FIG. 1.

In the second embodiment, the track error detection unit is not completely made inactive after the tracking error detection unit 10 starts its phase control unlike the embodiment of FIG. 1. That is, in the second embodiment, the track error detection unit is always kept active even when the tracking error detection unit 10 is making phase control, making it possible to restore the heads to the desired phase-locked state even from the unlocked-phase state which is brought about during trick playback.

The switching unit 30 includes the first switching unit 31 for switching the output from the tracking error detection unit 10 and the error signal from the track error detection unit 15, and the second switching unit 32 for adding the other error signal fed from the track error detection unit 15 through the attenuator 20 and the output produced from the tracking error detection unit 10. The first and second switching units 31 and 32 are both controlled to change to contact-a,-b,-c position by the control signal from the control unit 16.

Like the control in FIG. 1, when a trick playback command is supplied to this control mechanism, the control unit 16 first responds to this command to control the switching unit 30 so that the first and second switching units 31 and 32 are changed to contact-a position, and at the same time it detects a trick playback speed value and supplies it to the fast reproduce control unit 14.

When the tape transport speed reaches a predetermined value, the control unit 16 controls the switching unit 30 so that the first and second switching units 31 and 32 are changed to the contact-b position from the contact-a position, or that the output from the track error detection unit 15 is supplied to the phase control unit 17.

When the head scan phase reaches one track before the desired phase, the track error detection unit 19 supplies a signal indicative of this situation to the control unit 16. The control unit 16 is responsive to this signal to control the switching unit 30 so that the first and second switching units 31 and 32 are changed to the contact-b position to the contact-c position, or that the control signal to the phase control unit 17 is obtained as the sum of the output from the tracking error detection unit 10 and the output fed through the attenuator 20 from the track error detection unit 15 in place of the output from the track error detection unit 15.

Thus, the track error detection unit 19 is always active even when the tracking error detection unit 10 is making phase control. If the scan phase is unlocked during trick playback, the track error detection unit 19 makes phase pull-in control, drawing the heads back to the original trick playback track. As a result, the information for trick playback can be prevented from being not reproduced because of the tracking error as in the first embodiment of FIG. 1, or stable tracking can be performed.

While trick playback in the forward direction is made in the above embodiments, this invention is not limited to this direction, but can make trick playback in the reverse direction. In addition, while examples of 3× and 9× trick playback speeds are given in the above embodiments, an arbitrary trick playback speed may be selected, if necessary. Moreover, while the attenuator in FIG. 8 is provided for making the track error detection unit be used as auxiliary control relative to the main control by the tracking error detection unit, it may be omitted or its function can be easily provided in, for example, the track error detection unit without using the attenuator, or it can be easily modified in different ways without departing from the scope of the invention.

According to the above embodiment, there is provided a tracking control mechanism capable of fast pulling the head scan phase in a predetermined track position and precisely causing the heads to trace the tracks for trick playback when switching is made from the normal playback mode to the trick playback mode or when the playback speed in the trick playback mode is changed during the trick playback operation for the magnetic tape on which the information for trick playback of a given speed faster than the normal playback mode is already dispersedly recorded of consecutive tracks at proper positions corresponding to the scan path of the rotary magnetic heads.

Figure 9:
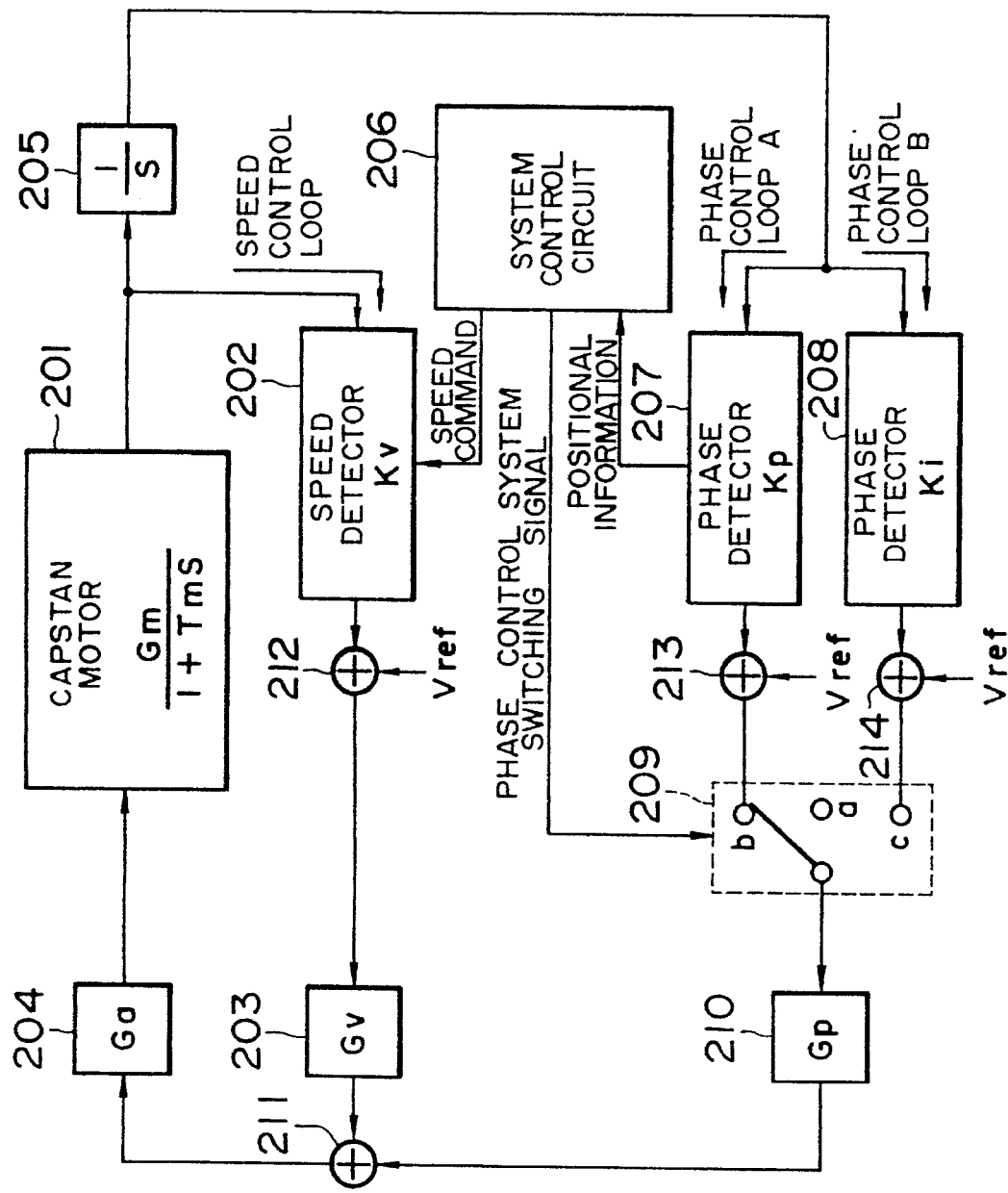
FIG. 9 is a block diagram to which reference is made in explaining the control circuit of the tracking control of FIG. 1 as the combination of a speed control system and a phase control system.

Before the third embodiment of the tracking control mechanism of the invention is mentioned, a description is made of the operations of the speed control system and phase control system which are formed of the fast reproduce control unit 14, the phase control unit 17, the motor drive circuit 9 and the capstan motor 6 in the first embodiment. FIG. 9 is a block diagram of the arrangement of the servo control for the speed control system and phase control system in the embodiment of FIG. 1. In FIG. 9, the magnetic tape, rotary cylinder and magnetic heads shown in FIG. 1 are not shown. Referring to FIG. 9, there are shown a capstan motor 201, a motor speed detector (frequency-voltage converter) 202, a control amplifier 203, a motor drive circuit 204, an integrator 205, a system control circuit 206 (corresponding to the control unit 16 in FIG. 1), a phase detector 207 for detecting scan track number error associated with the tracks on which trick playback data is already recorded, a phase detector 208 for detecting the tracking error from the reproduced signal from the heads, a switching circuit 209, a control amplifier 210, an adder 211, and comparators 212 to 214.

The phase detector 207 is constructed to for example detect the block address of reproduced data from the train of reproduced data and compare it with the block address table having the original trick playback data recorded so as to calculate the error between the current scan track and a desired trick playback track, thereby producing an error signal according to the scan track number error and error direction.

A description will be made of the tracking control for trick playback in the arrangement of FIG. 9.

When a trick playback command (not shown) is entered by the user, the system control circuit 206 responds to this command to control the switching circuit 209 to change to the contact-a position shown and at the same time it detects a command speed value of trick playback and supplies it to the speed detector 202.

Thus, the revolution speed of the capstan motor 201 starts to be controlled so that the tape speed is changed to a trick playback Speed value specified by the system control circuit 206. The tape speed is increased to a certain value only by the speed control loop with the phase control made inactive.

Then, when the tape transport speed reaches a certain value, the system control circuit 206 detects this situation from the motor speed add controls the switching circuit 209 so that the switching circuit is changed to the contact-b position from the contact-a position, or that the output from the phase detector 7 is supplied to the control amplifier 210. At this time, since the phase control is inactive, the heads do not always scan the recorded track for trick playback data but deviate from a desired track as shown in FIG. 2 the moment that the switching circuit 209 is changed to the contact-b position.

Therefore, when the scan path of the heads is deviated from a desired track the moment that the switching circuit 209 is changed to the contact-b position, an error signal according to the amount of this deviation and direction is supplied to the control amplifier 210 from the phase detector 207. Thus, the phase pull-in control is started so that this error signal is reduced to zero by the phase control of phase control loop A, or that the heads scan the desired track.

Then, when the head scan phase arrives one track before the desired phase, the phase detector 207 supplies a signal indicative of this situation to the system control circuit 206. The system control circuit 206 is responsive to this signal to control the switching circuit 209 to change to the contact-c position from the contact-b position, or control the switching circuit 209 so that the control signal to the control amplifier 210 is supplied from the phase detector 208 in place of the phase detector 207.

The phase detector 208 is formed of, for example, an area division ATF which is well known in DAT (digital audio tape recorder), and it produces an error signal corresponding to the amount of off-track and off-track direction of the heads relative to the recorded track.

After the switching circuit 209 is changed to the contact-c position, the phase pull-in control based on the error signal from the phase detector 208 is performed by the phase control loop B. Thus, the heads come to scan the center of the track which has desired trick playback data recorded.

In the trick playback operation of the tracking control mechanism shown in FIG. 9, or according to the embodiment shown in FIG. 1, the access speed required for the heads to come to scan the desired track depends on the phase pull-in control for track number error. If the trick playback speed is represented by N, the heads are necessary to be pulled in by a maximum of ±N/2 tracks for the recorded pattern shown in FIG. 2. Of course, the time taken for the heads to be pulled in by that amount of phase error is increased with the increase of the trick playback speed N. Thus, in the design of this tracking control, it is important to reduce this time as much as possible.

In other words, the trick playback data is recorded only on particular tracks, and thus when the operation mode is changed from the normal mode to a trick playback mode, or when the speed of the trick playback mode is changed, the video data is not reproduced until the magnetic heads come to scan the desired tracks. Therefore, in order to improve the quality of the reproduced picture, it is necessary that the desired tracks be scanned as soon as possible.

However, the tracking control mechanism of FIG. 9 has the drawback that the pull-in time to the target track cannot be so decreased.

This aspect will be mentioned below.

The transfer function (the phase response characteristic of heads to the step input) H(S) of the track number error pull-in operation of the phase control loop A can be expressed by the following equation (1), where $\gamma$ is the DC gain, $\omega n$ is the response frequency band of the system, and $\zeta$ is the damping coefficient of the speed control system.

$$H(S) = \frac{\omega n^2}{S^2 + 2\zeta\omega n S + \omega n^2} \gamma, \quad (1)$$

where $$\gamma = 1/Kp$$

$$\omega n = \sqrt{\frac{GaGmGpKp}{Tm}}$$

$$\zeta = \frac{GvKv}{2} \sqrt{\frac{GaGm}{TmGpKp}}$$

In the practical design of the tracking control mechanism of FIG. 9, the damping coefficient $\zeta$ is generally selected to be 1 or more as a critical condition considering the stability of the system. The following table 1 lists an example of parameters used when $\zeta$ is selected to be about 2.

TABLE 1

|    | DESIGN VALUES     | UNITS   |
|----|-------------------|---------|
| Ga | 5.56              | —       |
| Gm | $7.5 \times 10^3$ | rad/s/v |
| Tm | 0.53              | s       |
| Kv | $2.0 \times 10^{-2}$ | V/rad/s |
| Gv | 0.147             | —       |
| Kp | 16.8              | V/rad   |
| Gp | $2.4 \times 10^{-3}$ | —    |
| ωn | 56.32             | 1/S     |
| ζ  | 2.05              | —       |

Figure 10:
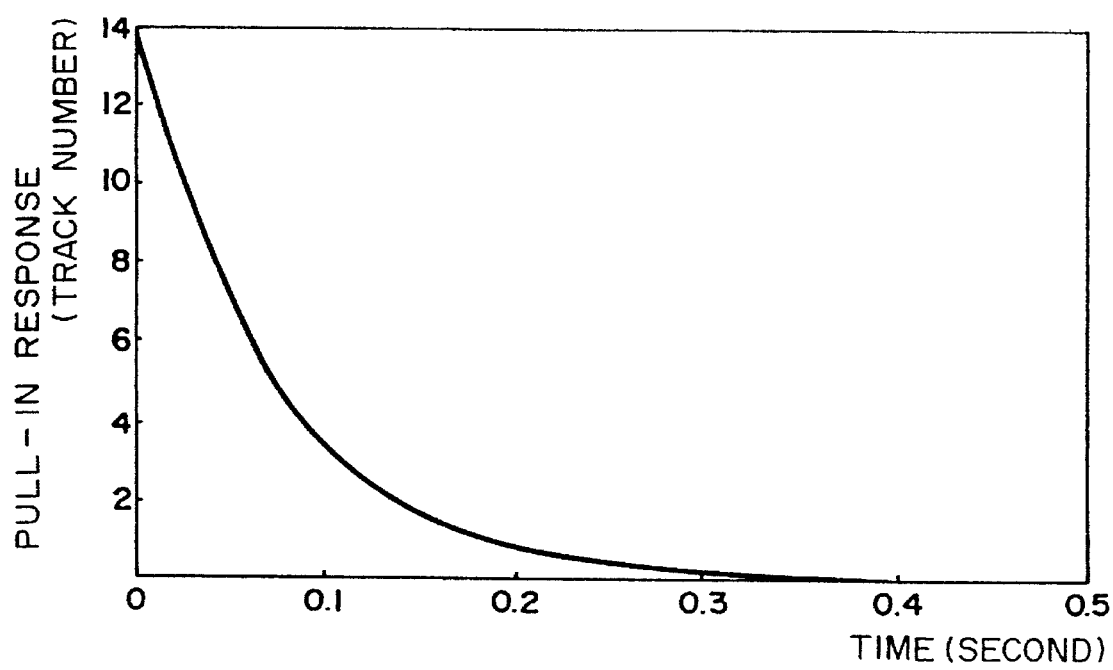
FIG. 10 is a graph of the characteristic of phase pull-in response of the tracking control of FIG. 9 with respect to time.

FIG. 10 is a graph of the phase pull-in response characteristic with respect to time which is estimated from the equation (1) under the conditions of the parameters of Table 1, 27× trick playback speed and step input of 27/2 tracks as the maximum phase pull-in error. From FIG. 10, it will be understood that it takes about 0.2 sec for the heads to be pulled in to within one track relative to the recorded track of 27-times normal speed trick video data. Thus, during this interval of time, the video data for 27× trick playback cannot be reproduced, or the video image is interrupted, or has a poor quality.

According to the third embodiment of the invention, there is provided a tracking control mechanism with the above problems solved, or capable of quickly pulling the heads in toward a predetermined track when the operation mode is changed from the normal playback mode to a trick playback mode or when the speed of the trick playback is changed, that is, capable of improving the quality of the reproduced image when the operation mode is shifted to a trick playback mode.

The third embodiment of the tracking control mechanism of the invention has a damping coefficient control unit for controlling the damping coefficient for tape transport speed control.

In the track number error pull-in process, since the stability of the system is not necessary, the damping effect of the speed control system is weakened in this period, and instead the phase pull-in response is controlled to be fast.

The damping coefficient control unit controls the damping coefficient ζ of the speed control feedback system to be 1 or below until the scan phase of the rotary magnetic heads arrives one track before the recorded track of trick playback data. Thus, the damping effect of the speed control is reduced and hence the maximum speed of the capstan motor is increased, making the phase pull-in response fast.

Moreover, after the scan phase of the heads arrives one track before the recorded track of trick playback data, the damping coefficient control unit controls the damping coefficient ζ to be 1 or above. Thus, the damping action of the speed control is intensified so that the scan phase of the heads can be stably converged to the target phase, and also the heads can make good tracking with the system stabilized.

The third embodiment of the tracking control of the invention will be described with reference to the drawings.

Figure 11:
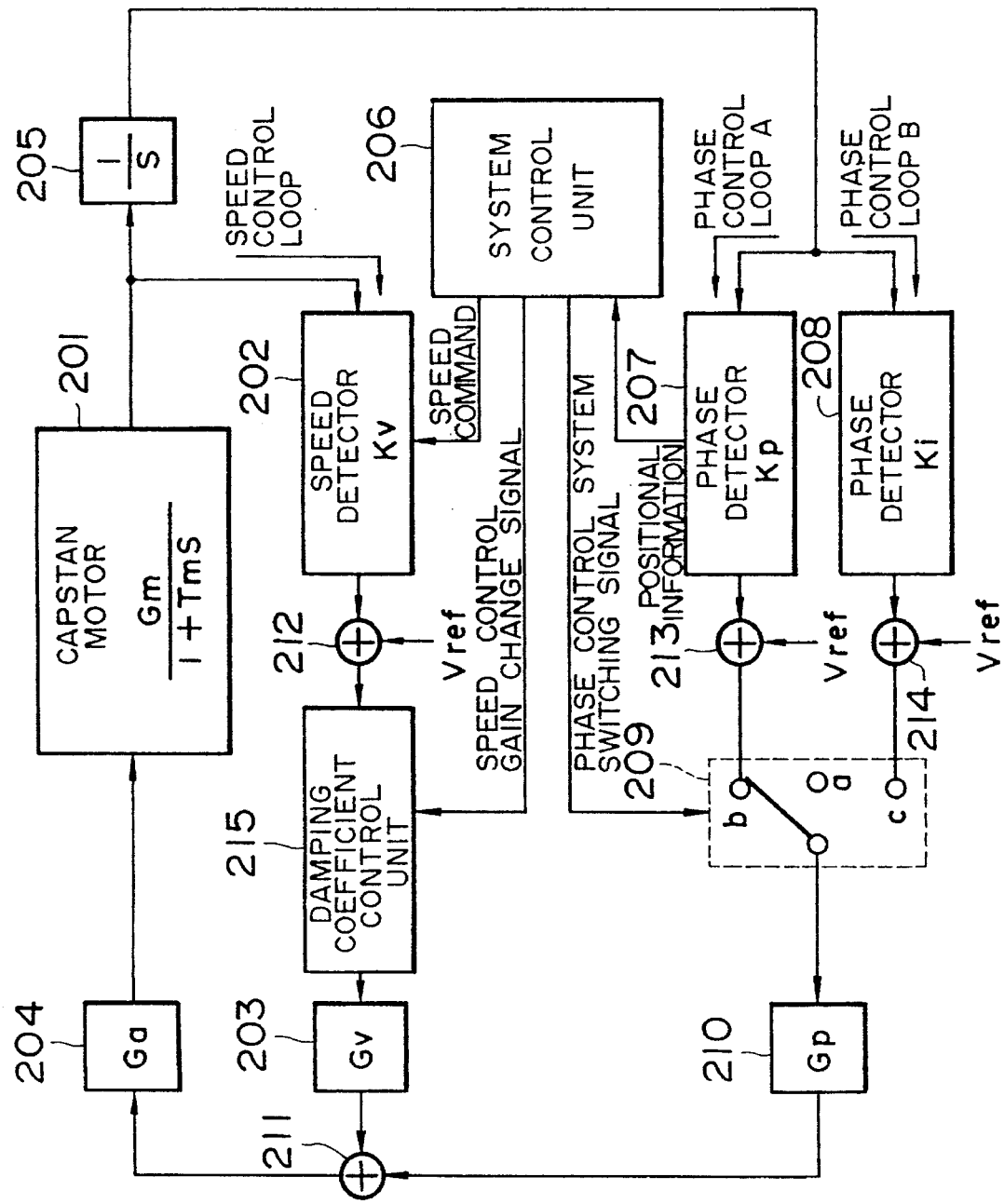
FIG. 11 is a block diagram of still another embodiment of the tracking control of the invention.

FIG. 11 is a block diagram of the construction of the third embodiment of the tracking control of the invention. In FIG. 11, there is shown a damping coefficient control unit 215 for changing the value of the damping coefficient ζ of the speed control system. Like elements corresponding to those in FIG. 9 are identified by the same reference numerals and operate fundamentally in the same way as those in FIG. 9.

A description will be made of the construction and operation of the damping coefficient control unit 215 different from the tracking control shown in FIG. 9.

Figure 12:
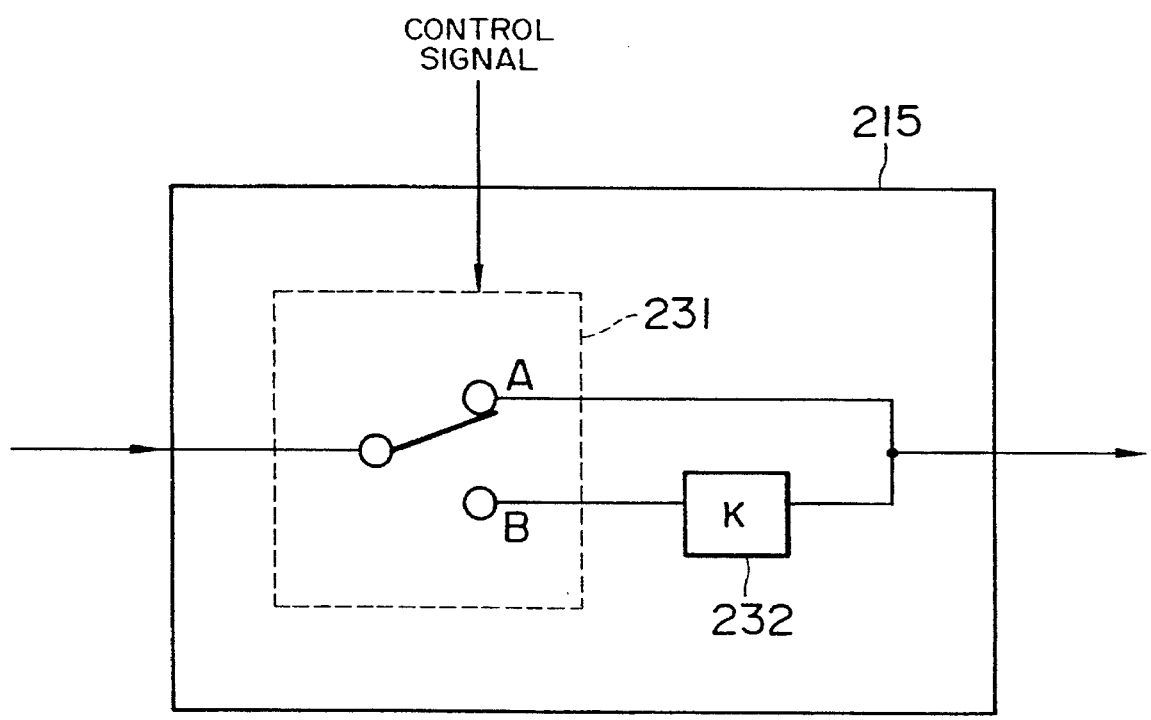
FIG. 12 shows a specific arrangement of a damping coefficient control unit of the tracking control of FIG. 11.

The damping coefficient control unit 215 operates to change the gain under the command from the system control circuit 206. FIG. 12 shows a specific example of the unit 215, which has a change-over switch 231 and an attenuator 232 with a gain K.

The system control circuit 206 produces a control signal which controls the change-over switch 231 to change to the contact-A position when the phase control loop B is selected for the phase control in normal playback and trick playback modes, and to the contact-B position when the phase control loop A is selected for the phase control in trick playback mode.

The damping coefficient control unit 215 is an element that is cascaded to the speed detector 202, and the change of the gain means the change of the value of damping coefficient ζ as is understood from the equation (1). In other words, when the change-over switch 231 is in the contact-a position to provide a high gain, the damping coefficient ζ is large. On the contrary, when the change-over switch 231 is in the contact-B position to provide a low gain, the damping coefficient ζ is reduced.

Therefore, when the large value of damping coefficient ζ is selected to be about 2 same as in the embodiment of FIG. 9 and when the small value of damping coefficient ζ is selected to be for example 0.5, the gain K of the attenuator 232 is designed to be ¼.

Figure 13:
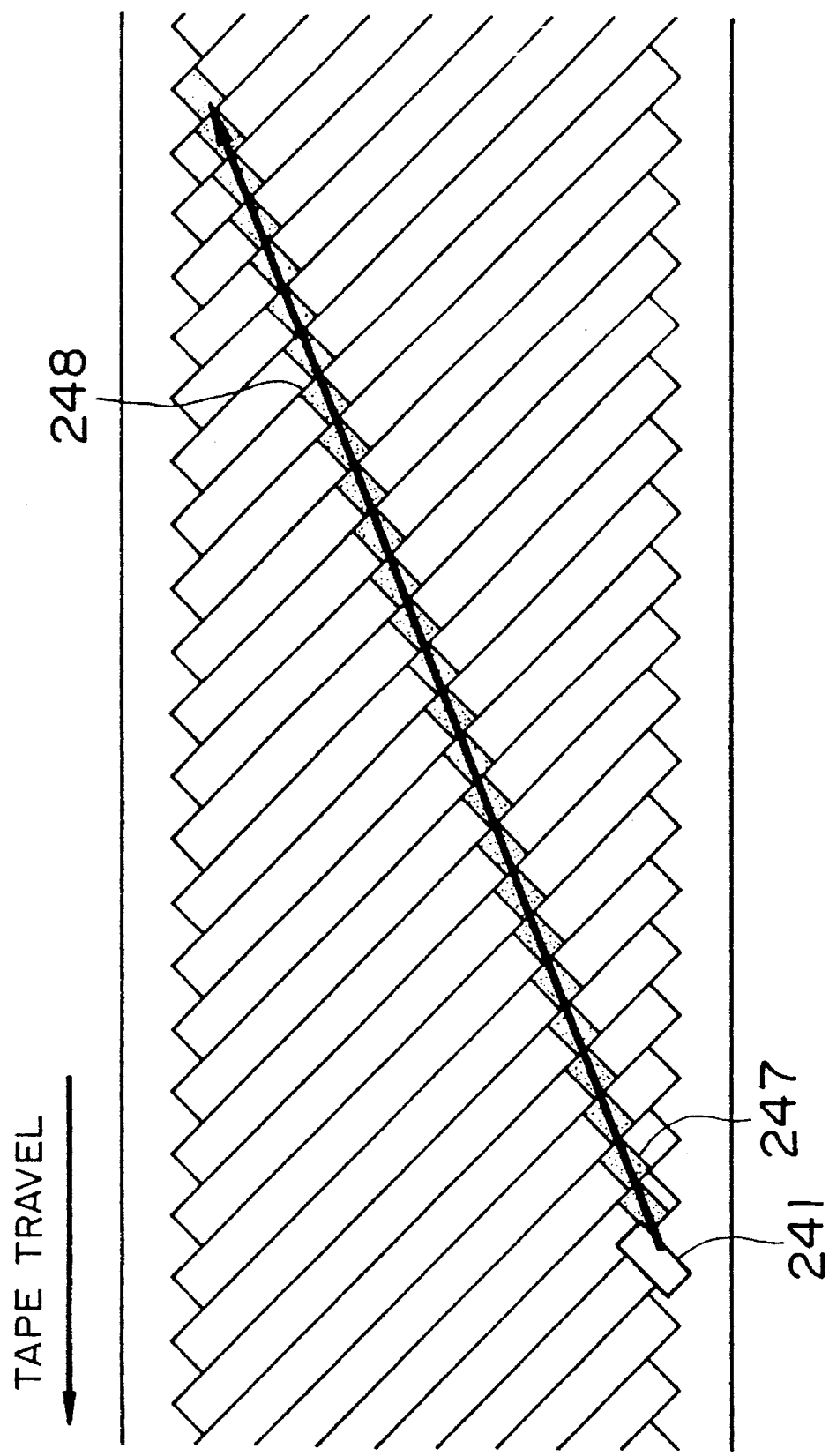
FIG. 13 shows a scan path of the magnetic heads in the fast playback mode of 27-times normal speed.
Figure 14:
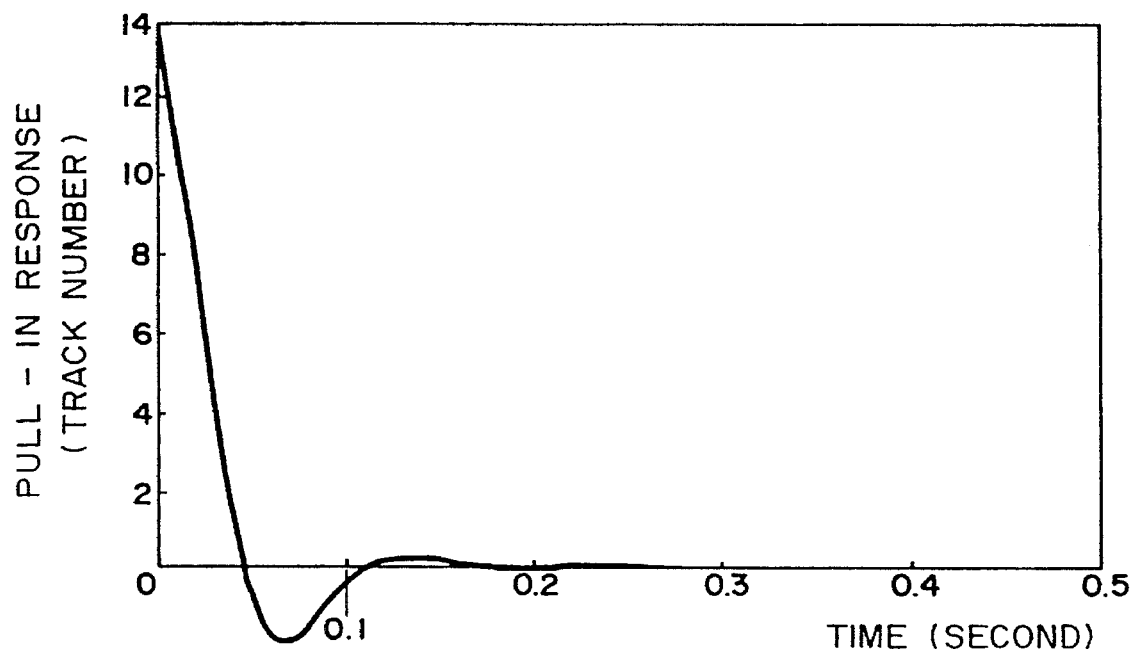
FIG. 14 is a graph showing the characteristic of track phase pull-in response of the tracking control of FIG. 11 with respect to time.

The operation of the whole arrangement of FIG. 11, under the conditions of 27× trick playback and gain K of attenuator 232 of unit 215 selected to be ¼, will be mentioned with reference to FIGS. 13 and 14.

In FIG. 13, there are shown a region 247 which has 27× trick playback video data recorded, and a scan path 248 along which the magnetic head 241 scan the 27× trick playback video data 247 in the 27× trick playback mode.

When a command of 27× trick playback is incoming, the system control circuit 206 is responsive to this command to control the switching circuit 209 to change to the contact-a position and also recognizes the trick playback speed from the command and supplies it to the speed detector 202. Thus, the capstan motor is accelerated to increase the revolution rate by the speed control feedback loop so that the tape transport speed is 27 times as high as the normal playback speed. At this time, the system control circuit 206 controls the damping coefficient control unit 215 so that the change-over switch 231 of the unit 215 can be changed to the contact-A position.

When the tape speed reaches the target 27-times normal speed, the phase control loop A makes phase pull-in control so that the scan phase of the magnetic heads is shifted to the phase of the scan path 248 shown in FIG. 13 as is similar to the control previously mentioned with reference to FIG. 9. At the same time, the system control circuit 206 orders the damping coefficient control unit 215 to change the change-over switch 231 to the contact-B position from the contract-A position.

Consequently, when the track number error pull-in operation is made by the phase control loop A, the gain of the speed control feedback loop is ¼ as compared with that in FIG. 9, or the speed damping coefficient ζ is about 0.5. Thus, the damping action of the speed control system is weakened, and the maximum speed of the capstan motor is increased, accelerating the phase pull-in response.

FIG. 14 is a graph of the phase pull-in response characteristic with respect to time, which is estimated from the equation (1) under the conditions that the speed damping coefficient ζ is selected to be about 0.5 and that the step input of 27/2 tracks as the maximum phase error in 27× trick playback mode is applied to the phase control loop A as is similar to the case of FIG. 9.

From FIG. 14, it will be understood that it takes about 0.04 sec for the heads to be converged within one track relative to a predetermined track which has 27× trick playback video data recorded. Thus, the time for access to the desired track is reduced to about ⅕ the time of 0.2 sec shown in FIG. 10.

Then, when the scan phase of the heads is pulled in within one track relative to the desired phase by the phase control loop A, the system control circuit 206 responds to the control signal from the phase detector 207 to control the switching circuit 209 to change to the contact-c position from the contact-b position, thereby switching the phase control to the phase control loop B, and at the same time to control the damping coefficient control unit 215 so that the change-over switch 231 of the unit 215 is changed again to the contact-A position from the contact-B position. Accordingly, the gain of the speed control feedback loop is set at the original high value, or the damping coefficient $\zeta$ of the speed control is fixed to 1 or above. Thus, the damping action of the speed control is intensified so that the scan phase of the heads is stably converged to the target phase by the phase control of the phase control loop B, and that the head can make good tracking with system being stabilized.

The third embodiment of the invention has been mentioned as above. While the trick playback in the forward direction is described in this embodiment, the trick playback in the reverse direction and the trick playback of arbitrary speed may be naturally performed. In addition, while the damping coefficient $\zeta$ is controlled by changing the gain of the speed control loop, it may be of course controlled by changing the gain of the phase control loop or the gain of the control amplifier as can be supposed for example from the equation (1). Moreover, since the damping coefficient $\zeta$ can be changed if the heads are close to the track which has trick playback video data recorded, the pull-in range is particularly not limited to within one track before the target phase as in the above embodiment. Also, while two values of gain, coefficient or the like are switched once, three or more values may be used and switched a plurality of times. Thus, various changes and modifications can be made without departing from the scope of the invention.

According to the embodiment of the invention mentioned above, in the tracking control for trick playback of the magnetic tape on which information for trick playback of an arbitrary speed faster than the normal playback speed is already recorded dispersedly at proper positions of tracks according to the scan track of the heads, the damping coefficient $\zeta$ of the speed control system is controlled to be fixed to 1 or below until the scan path of the heads arrive near the track which has the trick playback video data recorded, and thereafter to be changed to 1 or above. Therefore, when the operation mode is shifted from the normal playback mode to a trick playback mode or when the speed of the trick playback mode is changed, the scan phase of the heads can be quickly pulled in toward a certain track, and thus the picture quality at the time of shifting to a trick playback mode can be improved.

In the digital magnetic recording/reproducing apparatus with standard and fast playback modes associated with this invention, the user often selects one of the standard playback mode and the fast playback mode or changes the speed of the fast playback mode. When the playback speed is changed, the following problem is caused.

When the playback mode is changed from the normal mode to fast mode, or when the speed of the fast playback mode is changed, it is necessary to control the tape speed and the position or phase of the reproduce heads in order that the heads can trace the correct trick play tracks. A slight time after the tape speed is ordered to change, the desired data can be obtained from the target position which the heads are controlled to reach. Thus, during this interval, correct video data cannot be reproduced from the tape and hence cannot be decoded. As a result, no picture is displayed on the television screen during the time. Each time the user selects the fast playback mode or changes the speed of the fast playback mode, the image is interrupted, or the picture quality is reduced.

The fourth embodiment of the tracking control of the invention can solve the above problem, or can supply a video signal to the television receiver, thereby improving the picture quality even when the reproduced signal from the tape is interrupted and hence cannot be decoded as is observed at the time of switching from the normal playback mode to the fast playback mode.

The fourth embodiment of the invention has a memory provided for storing the reproduced video signal.

When the signal from the tape is interrupted by the change of playback speed, just the preceding reproduced video signal is read from the memory and switched to by the switching unit, so that the video output can be stably obtained without being interrupted.

The fourth embodiment of the invention as an example of the application of the invention to a digital VTR will be described in detail with reference to FIG. 15.

Figure 15:
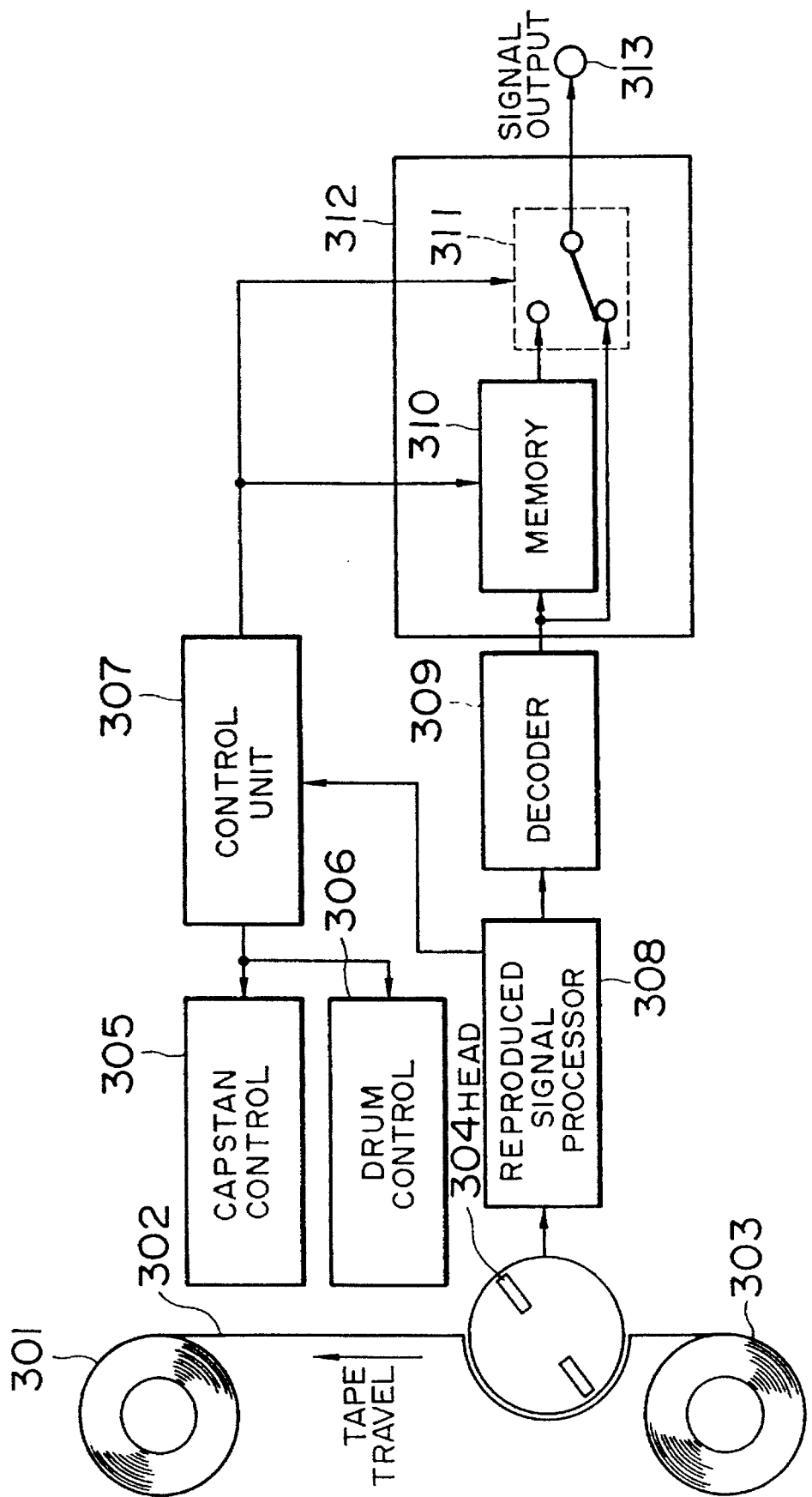
FIG. 15 is a block diagram of still another embodiment of the tracking control of the invention.

FIG. 15 is a block diagram of the fourth embodiment of the invention. In FIG. 15, there are shown a take-up reel 301 around which a magnetic tape is wound, the magnetic tape 302, a supply reel 303 from which the magnetic tape is unwound, reproduce heads 304 for reproducing a signal from the magnetic tape, and a capstan control circuit 305 for controlling the transport speed of the tape and the position (phase) of the heads relative to the recorded track on the tape. There are also shown a drum control circuit 306 for controlling the rotary speed and phase of the heads 304, a control unit 307 (equivalent to the control unit 16 shown in FIG. 1) for controlling the whole system, a reproduced signal processor 308 by which the signal reproduced by the heads is processed in accordance with a predetermined format, a decoder 309 for expanding the compressed signal and decoding it, a video signal selecting circuit 312 which is formed of a memory 310 for storing the video signal and a switching unit 311 for switching the decoded video signal and the video signal stored in the memory, and a signal output terminal 313.

A description will be made 0f the operation of the digital VTR of the fourth embodiment in the normal playback mode.

When a playback start command is externally fed to the control unit 307, the drum control circuit 306 starts controlling a drum motor (not shown) which controls the rotary speed and phase of the heads 304. At the same time, the capstan control circuit 305 controls the rotary speed of the capstan motor to thereby make the magnetic tape 302 be transported at a predetermined speed and also make the heads 304 scan just the center of the recorded track. This phase control can be performed with ease by using, for example, the area division ATF system which is well known in DAT (digital audio tape recorder). Although the details of that control are not directly concerned with the main point of this invention and thus will not be described, the heads 304 are controlled to rotate at a certain speed and phase by a well-known control in the conventional analog VTR.

Thus, the heads 304 scan the center of the track on the magnetic tape 302 as indicated in FIG. 2 by the scan path.

The recorded signal on the tape 302 is reproduced by the heads 304 and fed to the reproduced signal processor 308 from which it is produced as data of a certain format. The decoder 309 decodes the data from the processor according to a certain procedure and produces it as video data.

In the playback mode, the control unit 307 also makes the memory 310 in the writing state and controls the switching unit 311 so that the decoded signal can be produced at the output terminal 313.

Since the memory 310 is in the writing mode, the decoded video signal from the decoder 309 is written one after another in the memory 310. The decoded video signal from the decoder 309 is also fed through the switching unit 311 to the output terminal 313.

A description will be made of the operation of the digital VTR of the fourth embodiment in the three-times normal speed playback mode.

When a three-times normal speed playback command is externally supplied to the control unit 307, the capstan control circuit 305 controls the rotary speed of the capstan motor so that the transport speed of the tape 302 is increased three times the normal playback speed, and it controls the heads to scan along the scan path 22 shown in FIG. 2, or controls the phase of the heads so that the three-times playback data can be correctly reproduced from the target scan path. This phase control is made by, for example, detecting the deviation from the target phase from the track address written with the recorded data and controlling the heads to scan the desired track so that the deviation is brought to zero. In addition, once the heads are pulled in the phase for the three-times normal speed playback track, the tracking control is performed by the above ATF control. The practical procedure can be easily carried out by the well-known control technology. The details of the procedure are not directly concerned with the main point of the invention, and hence will not be described here.

When the heads 304 come to scan just the recorded track for 3× trick playback data, the 3× trick data is started to be reproduced and fed to the signal processor 308, by which it is produced as data of a predetermined format. The decoder 309 decodes the three-times normal speed data 25 (FIG. 2) of the produced data. The decoded video signal is written in the memory 310 and also fed to the output terminal 313 as is similar to the normal playback mode.

While the operation in the 3× normal speed mode is described above, the operation in the 9× normal speed mode are the same except for the use of a different transport speed and 9× trick data 26 (FIG. 2). The operation in the other trick modes is also the same.

In the normal playback and fast playback mentioned above, different tape transport speeds are used and the heads 304 are controlled to scan different tracks. Moreover, when different tap speeds such as 3-times or 9-times normal speed are used in the fast playback mode, the tape transport speed and the tracks to be traced must be changed for each trick speed. Therefore, after different playback speeds are switched, a slight time is taken for the tape transport speed change and phase control on the heads 304 to be completely carried out to reach the target values. During this interval, the correct signal cannot be reproduced from the tape 302 and hence cannot be decoded by the decoder.

Thus, in the digital VTR of the fourth embodiment, during the time in which the correct signal cannot be reproduced from the tape 302 and hence cannot be decoded, the video signal is read from the memory 310 and fed to the output terminal 313. This operation will hereinafter be described in detail.

When the playback speed is changed, the control unit 307 controls the memory 310 to change from the write mode to the read mode. Then, it controls the switching unit 311 to switch so that the video signal read from the memory 310 can be fed to the output terminal 313. Thus, the video signal decoded just before the playback speed is changed is read from the memory 310 and repeatedly produced.

Thereafter, the control unit 307 controls the capstan control circuit 305 to change the tape transport speed to a specified value, thereby making phase control on the heads 304 so that the heads can trace the desired track. During this interval of time, the correct signal cannot be reproduced from the tape 302 and hence not decoded. Instead, the video signal stored in the memory 310 is read and fed to the output terminal 313.

When the transport speed of the tape 302 reaches a certain speed so that the heads 304 come to scan the target track, a signal indicating that the data can be normally reproduced is supplied from the reproduced signal processor 308 to the control unit 307. The control unit 307 is responsive to this signal to change the position of the switching unit 311 so that the output from the decoder 309 is fed to the output terminal 313, and also to make the memory 310 again in the writing mode.

FIGS. 16A and 16B show the relations between the tape speed change and video output control which are obtained when switching is made between the normal playback mode and fast playback mode and when the speed of the fast playback is changed as mentioned above.

Thus, the video image can be prevented from being interrupted when the operation mode is shifted from the normal playback mode to the fast playback mode or when the speed of the fast playback is changed or even when the operation mode is changed back to the normal playback mode from the fast playback mode, in which case the video signal is not decoded because the heads are out of track. Therefore, the picture quality in the fast playback operation can be improved.

While in the fourth embodiment shown in FIG. 15 the video signal selection circuit 312 for selecting the video signal is provided after the decoder 309 so that the selected signal can be fed to the output terminal 313, the video signal selection circuit 312 may be provided before the decoder 309 so that the video signal is selected before being decoded and fed to the decoder 309. Alternatively, the memory included in the decoder 309 may be used additional memory with memory 310 or another memory may be commonly used. That is, various changes and modifications can be easily made without departing from the scope of the invention.

Also, while in the fourth embodiment shown in FIG. 15 the video signal selection circuit 312 is formed of the memory 310 and the switching unit 311, it may be formed only of the memory 310. FIG. 17 shows the fifth embodiment as an example of the application of this arrangement to the digital VTR. In FIG. 17, like elements corresponding to those in FIG. 15 are identified by the same reference numerals.

The video signal selection circuit 312 shown in FIG. 17, when selecting the input signal and producing it, sequentially stores the input signal in the memory 310 and timely reads it from the memory. Thus, the input signal is produced as it is after a certain time. When the signal stored in the memory 310 is outputted, the memory 310 is stopped from writing and repeats only the reading operation. In this case, since the contents of the memory 310 are not updated, just the preceding input signal is continuously produced. Thus, even if the switching unit 311 shown in FIG. 15 is not provided in the video signal selection circuit, the same effect can be achieved.

Another embodiment will be described.

While the digital VTR shown in FIG. 15 includes the decoder 309, the decoder may be removed from the VTR, and instead the decoder circuit included in the tuner is used to expand the video signal. A description will hereinafter be made of an example of the application of the invention to the digital VTR with no decoder.

Figure 18:
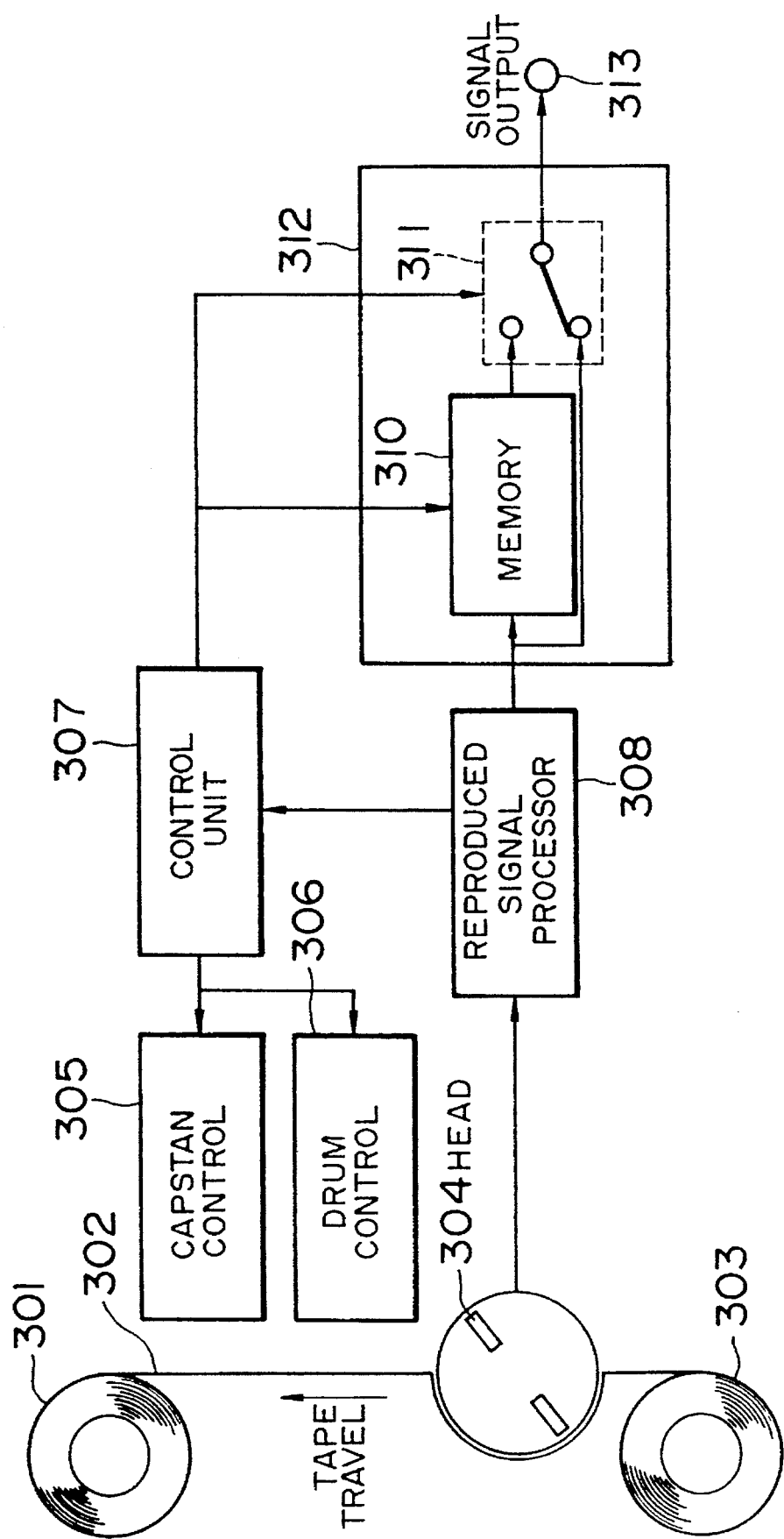
FIG. 18 is a block diagram of still another embodiment of the tracking control of the invention.

FIG. 18 is a block diagram of the digital VTR of the sixth embodiment of the invention. In FIG. 18, like elements corresponding to those in FIG. 15 are identified by the same reference numerals.

A description will be made of the normal-mode operation of the digital VTR of the fifth embodiment.

When a playback start command is externally fed to the control unit 307, it controls the drum control circuit 306 and capstan control circuit 305 as is similar to the fourth embodiment. Thus, the heads 304 scan the center of the track on the magnetic tape 302 along the scan path 21 in FIG. 2.

The recorded signal on the tape 302 is reproduced by the heads 304 and fed to the reproduced signal processor 308 by which it is produced as data of a predetermined format.

Also, in the playback mode, the control unit 307 controls the memory 310 to be in the writing state and controls the switching unit 311 so that the processed signal in the processor 308 can be produced at the output terminal 313. In this embodiment, the video signal selection circuit 312 is formed of the memory 310 and the switching unit 311. In this case, the memory 310 is made in the writing state, and the processed video signal from the processor 308 is written in the memory 310. The processed video signal from the processor 308 is controlled to be fed through the switching unit 311 to the output terminal 313.

A description will be made of the operation of the digital VTR of the sixth embodiment in the 3× trick playback mode.

When a 3× trick playback command is externally fed to the control unit 307, it controls the capstan control circuit 305 so that the heads 304 scan the block 25 (FIG. 2) in which 3× trick playback data is already recorded.

When the heads 304 trace just the recorded track (block) for 3× trick playback data, the 3× trick data is started to be reproduced and fed to the reproduced signal processor 308 by which it is produced as data of a certain format. This reproduced signal is written in the memory 310 and produced at the output terminal 313, as is similar to the normal playback mode.

While 3× normal speed operation is described above, 9× normal speed operation may be similarly performed except that the tape transport speed is different and that 9× trick playback data 26 (FIG. 2) is used. Other fast trick speed operations can be similarly made.

As is similar to the fourth embodiment, when the playback speed is changed, a slight time is taken for the heads 304 to reach just the desired track. During this interval of time, the correct signal is not reproduced from the tape.

Thus, in the digital VTR of the sixth embodiment, the video signal is read from the memory 310 and fed to the output terminal 313 during the time in which the correct signal is not reproduced from the tape 302.

When the playback speed is changed, the control unit 307 controls the memory 310 to change from the writing to reading operation. Then, it controls the switching unit 311 so that the video signal read from the memory 310 can be fed to the output terminal 313. Thus, the preceding video signal reproduced just before switching is read from the memory 310 so as to be repeatedly produced.

Thereafter, the control unit 307 controls the capstan control circuit 305 so that the tape transport speed is changed to a specified value, thereby controlling the phase of the heads 304 so that the heads can trace a predetermined track (block). During this interval, the correct signal is not reproduced from the tape 302. Instead, the video signal stored in the memory 310 is produced at the output terminal 313.

Then, when the speed of the magnetic tape 302 reaches a certain value and the heads 304 start to trace a predetermined track, the reproduced signal processor 308 produces a signal indicating that data can be normally reproduced and supplies it to the control unit 307. The control unit 307 responds to this signal to control the video signal selection circuit 312 to change the position of the switching unit 311 so that the output from the reproduced signal processor 308 is produced at the output terminal 313, and also it controls the memory 310 to be again in the writing state.

Thus, the video signal can be prevented from being interrupted when the operation mode is changed from the normal playback mode to the fast playback mode, or when the speed of the fast playback is changed or even when the operation mode is changed back to the normal playback mode from the fast playback mode, in which case the video signal is not reproduced because the heads are out of track. Therefore, the picture quality in the fast playback operation can be improved.

While in the sixth embodiment shown in FIG. 18 the video signal selection circuit 312 for selecting the video signal is provided after the reproduced signal processor 308 so that the selected signal can be produced at the output terminal 313, other various changes and modifications can be easily made in this invention without departing from the scope of the invention.

Moreover, while in the sixth embodiment shown in FIG. 18 the video signal selection circuit 312 is formed of the memory 310 and the switching unit 311, it may be formed only of the memory 310, as is similar to the fifth embodiment.

The first to fifth embodiments of the invention have been described as above.

While examples of the fast playback mode in the forward direction are given in the above embodiments, the fast playback mode in the reverse direction may be similarly made. In addition, while examples of 3× and 9× trick playback speeds are given in the above embodiments, the fast playback mode of arbitrary speeds may be made, if necessary. In the invention, other various changes and modifications can be easily made without departing from the scope of the invention.

Thus, according to the embodiments of the invention, there are provided digital VTRs capable of stably producing the video signal without interruption even when the decoded signal is interrupted because the signal is not normally reproduced from the tape in the case where the operation mode is changed from the normal playback mode to the fast playback mode or the speed of the fast playback mode is changed.

What is claimed is:

1. In a helical scan digital magnetic reproducing apparatus having a rotary cylinder, magnetic heads mounted on said rotary cylinder, and a magnetic tape wrapped around said rotary cylinder and which has a digital information signal recorded on a plurality of recorded tracks so that said magnetic heads scan said recorded tracks to read said digital information signal, a tracking control for controlling the speed of said magnetic tape in order for said magnetic heads to precisely trace said tracks, wherein said reproducing apparatus has a standard playback mode in which said apparatus makes playback operation at a normal speed and a fast playback mode in which said apparatus makes playback operation at a higher speed than said normal speed, each of said plurality of tracks is divided into a plurality of blocks each of which has recorded thereon said digital information signal, and an identification signal including a track number for indicating the corresponding one of said tracks and a block number for indicating the corresponding one of said blocks, and at least one particular block of said blocks of each track has recorded thereon said digital information signal for said fast playback mode, said particular blocks of said tracks being arranged on said plurality of tracks in such a manner that in said fast playback mode said magnetic heads scan said particular blocks along their scan path on said magnetic tape, said tracking control comprising:

fast reproduce control means for controlling said magnetic tape to be transported at said higher speed than said standard speed;

means for detecting positional error between the track of a reproduced one of said blocks and the track of said particular block on the basis of said identification signal of said reproduced block which said heads have reproduced and generating a track error signal corresponding to said positional error;

tracking error detection means for detecting positional error between said magnetic heads and a target track on the basis of the signal reproduced by said magnetic heads and generating a tracking error signal corresponding to said positional error;

switching means for selectively producing one of said track error signal and said tracking error signal;

phase control means for controlling the speed of said magnetic tape on the basis of the output from said switching means so that said positional error can be reduced to zero; and control means for controlling said fast reproduce control means and said switching means to operate, wherein said control means, in said fast playback mode, controls said fast reproduce control means to operate, thereby accelerating said magnetic tape to said higher speed, and when said magnetic tape has reached said higher speed, controls said switching means to produce said track error signal, and also when said track error signal has entered in a certain range, controls said switching means to produce said tracking error signal.

2. A tracking control according to claim 1, wherein said track error signal from said means for generating said track error signal includes a first track error signal and a second track error signal which is formed by attenuating said first track error signal, said switching means includes first switching means for selectively producing one of said tracking error signal and said first track error signal, and second switching means for adding said second track error signal to said tracking error signal and producing the sum signal, and said control means, when said track error signal has reached said certain range, controls said switching means so that said second switching means supplies said sum signal to said phase control means.

3. A tracking control according to claim 1, wherein said means for generating said track error signal has an address table showing the relation between the track numbers of said respective tracks and the block numbers of said particular blocks, detects the block number of a block reproduced by said magnetic heads from said identification signal when said heads trace a reference track, reads the block number of said particular block of said reference track from said address table and generates said track error signal on the basis of the difference between the block number detected from said identification signal and the block number read from said address table.

4. A tracking control according to claim 2, wherein said means for generating said track error signal has an address table showing the relation between the track numbers of said respective tracks and the block numbers of said particular blocks, detects the block number of a block reproduced by said magnetic heads from said identification signal when said heads trace a reference track, reads the block number of said particular block of said reference track from said address table and generates said track error signal on the basis of the difference between the block number detected from said identification signal and the block number read from said address table.

5. A tracking control according to claim 3, wherein said reproducing apparatus having a plurality of fast playback modes provided for a plurality of different higher speeds than said normal playback speed, and said address table is provided for each of said fast playback modes.

6. A tracking control according to claim 3, wherein said means for generating said tracking error signal generates said tracking error signal on the basis of a cross-talk signal reproduced from adjacent tracks when said magnetic heads trace a target track.

7. A tracking control according to claim 1, wherein said fast reproduce control means has a feedback speed control system for controlling the speed of said magnetic tape on a feedback basis so that the actual tape transport speed coincides with a target speed (Vref), said feedback speed control system has damping coefficient control means for adjusting a damping coefficient of said feedback control, and said control means, after the speed of said magnetic tape has reached said higher speed in said fast playback mode, controls said damping coefficient control means to set said damping coefficient to a first value before the output from said switching means reaches said certain range and set it to a second value larger than said first value when the output from said switching means has entered in said certain range.

8. A tracking control according to claim 7, wherein said first value of said damping coefficient is selected to be 1.

9. A tracking control according to claim 1, wherein said digital information signal recorded on said tracks includes a digital video signal, said tracking control further comprising:

a video signal reproducing circuit for producing the original video signal from the signal reproduced by said magnetic heads;

a memory circuit for storing the most recent video signal reproduced; and a signal switching circuit for receiving said video signal produced from said video signal reproducing circuit and the output from said memory circuit and selectively producing one of said two input signals, said control means controlling said switching circuit to produce said video signal stored in said memory circuit when the original video signal is not yet produced from said video signal reproducing circuit during the time in which the speed of said magnetic tape is changed in said reproducing apparatus.

10. A tracking control according to claim 9, wherein said digital information signal recorded on said tracks includes a compressed digital video signal, said video signal reproducing circuit has a reproduced signal processing circuit for processing the signal reproduced by said magnetic heads according to a predetermined format and a decoder for expanding said compressed digital video signal, thereby decoding it into the original video signal, and said signal switching circuit selectively produces one of the output from said decoder and the output from said memory circuit.

11. A tracking control according to claim 9, wherein said digital information signal recorded on said tracks includes a compressed digital video signal, said video signal reproducing circuit has a reproduced signal processing circuit for processing the signal reproduced by said magnetic heads according to a predetermined format and a decoder for expanding said compressed digital video signal, thereby decoding it into the original video signal, and said signal switching circuit selectively produces one of the output from said video signal reproducing circuit and the output from said memory circuit.

12. A tracking control according to claim 1, wherein said digital information signal recorded on said tracks includes a digital video signal, said tracking control further comprising:

a video signal reproducing circuit for producing the original video signal from the signal reproduced by said magnetic heads; and a memory circuit for storing the most recent video signal reproduced, said control means being constructed to control said memory circuit to write said video signal from said video signal reproducing circuit and at the same time to read the written video signal from said memory circuit according to a certain timing, said control means controlling said memory circuit to stop writing said video signal and read said video signal from said memory when the original video signal is not yet produced from said video signal reproducing circuit during the time in which the speed of said magnetic tape is changed in said reproducing apparatus.

13. A tracking control according to claim 12, wherein said digital information signal recorded on said tracks includes a compressed video signal, and said video signal reproducing circuit has a reproduced signal processor for processing the signal reproduced by said magnetic heads according to a certain format, and a decoder for expanding said compressed digital video signal, thereby decoding it into the original video signal.

14. A tracking control according to claim 9, wherein mode switching is made between said standard playback mode and said fast playback mode or the playback speed in said fast playback mode is changed during the time in which the playback speed of said magnetic tape is changed.

* * * * *